United States Patent
Skupin et al.

(10) Patent No.: US 11,386,660 B2
(45) Date of Patent: Jul. 12, 2022

(54) ADVANCED VIDEO DATA STREAM EXTRACTION AND MULTI-RESOLUTION VIDEO TRANSMISSION

(71) Applicant: Fraunhofer-Gesellschaft zur Foerderung der angewandten Forschung e.V., Munich (DE)

(72) Inventors: Robert Skupin, Berlin (DE); Cornelius Hellge, Berlin (DE); Benjamin Bross, Berlin (DE); Thomas Schierl, Berlin (DE); Yago Sánchez De La Fuente, Berlin (DE); Karsten Suehring, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 120 days.

(21) Appl. No.: 16/576,051

(22) Filed: Sep. 19, 2019

(65) Prior Publication Data

US 2020/0012863 A1  Jan. 9, 2020

Related U.S. Application Data

(63) Continuation of application No. PCT/EP2018/056788, filed on Mar. 19, 2018.

(30) Foreign Application Priority Data

Mar. 20, 2017 (EP) ..................... 17161917

(51) Int. Cl.
- *G06V 20/40* (2022.01)
- *H04N 19/59* (2014.01)
- *G06T 7/12* (2017.01)

(52) U.S. Cl.
CPC ............. *G06V 20/46* (2022.01); *G06T 7/12* (2017.01); *G06V 20/49* (2022.01); *H04N 19/59* (2014.11)

(58) Field of Classification Search
CPC ........... G06K 9/00744; G06K 9/00765; H04N 19/59; H04N 19/172; H04N 19/103;
(Continued)

(56) References Cited

U.S. PATENT DOCUMENTS

2007/0200923 A1* 8/2007 Eleftheriadis ...... H04N 21/4316
                                                         348/14.08
2009/0187960 A1   7/2009 Lee et al.
(Continued)

FOREIGN PATENT DOCUMENTS

KR  20090079838 A  7/2009
KR  20160019091 A  2/2016
(Continued)

OTHER PUBLICATIONS

Deshpande, Sachin, "On Motion-Constrained Tile Sets Extraction Information Set SEI", Joint Collaborative Team on Video Coding (JCT-VC), Jan. 15, 2017, [JCTVC-Z0037] (version 2), 7 pp.
(Continued)

*Primary Examiner* — Zhitong Chen
(74) *Attorney, Agent, or Firm* — Perkins Coie LLP; Michael A. Glenn

(57) ABSTRACT

A concept for a video data stream extraction is presented which is more efficient namely which is, for example, able to more efficiently deal with video content of a type unknown to the recipient with videos of different type differing, for instance, in view-port-to-picture-plane projection, etc., or which lessens the extraction process complexity. Further, a concept is described using which a juxtaposition of different versions of a video scene, the versions
(Continued)

differing in scene resolution, may be provided more efficiently to a recipient.

22 Claims, 8 Drawing Sheets

(58) Field of Classification Search
CPC ...... H04N 19/157; H04N 19/33; H04N 19/70; G06T 7/12
See application file for complete search history.

(56) References Cited

U.S. PATENT DOCUMENTS

| | | | |
|---|---|---|---|
| 2012/0170648 A1* | 7/2012 | Chen | H04N 19/174 375/240.03 |
| 2015/0016504 A1* | 1/2015 | Auyeung | H04N 19/162 375/240.02 |
| 2017/0201766 A1 | 7/2017 | Choi | |
| 2017/0318288 A1* | 11/2017 | Wu | H04N 19/70 |

FOREIGN PATENT DOCUMENTS

| | | |
|---|---|---|
| KR | 20170020780 A | 2/2017 |
| WO | 2015009676 A1 | 1/2015 |
| WO | 2016026526 A2 | 2/2016 |
| WO | WO-2016026526 A2 * | 2/2016 ............ H04N 19/13 |
| WO | 2016180486 A1 | 11/2016 |

OTHER PUBLICATIONS

Skupin, Robert, et al., "On MCTS extraction", (JCTVC-X0039), JCT-VC of ITU-TSG16 WP3 and ISO/IEC JTC1/SC29/WG11 24th Meeting: Geneva, CH, (published on May 29, 2016), 5 pp.

Boyce, Jill et al., "JCTVC-Z1005", •HEVC Additional Supplemental Enhancement Information (Draft 1), Joint Collaborative Team on Video Coding (JCT-VC) of ITU-T SG 16 WP 3 and ISO/IEC JTC 1/SC 29/WG 11, 26th Meeting: Geneva, CH, Jan. 12-20, 2017.

ITU-T, "Series H: Audiovisual and Multimedia Systems", Recommendation H.265 (04/13), Infrastructure of audiovisual services—Coding of moving video, High efficiency video coding, Online: http://www.itu.int/rec/T-REC-H.265-201304-1.

Skupin, Robert, et al., "MCTS extraction with slice reordering", (JCTVC-AA0029), JCT-VC of ITU-T SG16 WP3 and ISO/IEC JTC1/SC29/WG11 27th Meeting: Hobart, AU, (Mar. 21, 2017).

ITU-T, "[Uploaded in 16 parts] Series H: Audiovisual and Multimedia Systems", XP055224026, CH Retrieved from the Internet URL:https://www.itu.int/rec/dologin_pub.asp?lang=e&id=T-REC-H.265-201504-I!!PDF-E&Type=items (pp. 1-610), Apr. 1, 2015, pp. 0-23.

Skupin, Robert, et al., "On MCTS extraction", JCT-VC Meeting; Oct. 14, 2016; Chengdu; (Joint Collaborative Team on Video Coding of ISO/IEC JTC1/SC29/WG11 and ITU-T SG. 16) URL: http://wftp3.itu.int/av-arch/jctvc-site/, No. JCTVC-Y0031-v2, Oct. 20, 2016 (Oct. 20, 2016), XP030118073, 5 pp.

\* cited by examiner

| | Descriptor |
|---|---|
| mcts_extraction_info_set() { | |
|   num_extraction_info_sets_minus1 | ue(v) |
|   for( i = 0; i <= num_extraction_information_sets_minus1; i++ ) { | |
|     num_associated_tile_set_identifiers_minus1[ i ] | ue(v) |
|     for( j = 0; j <= num_associated_tile_set_identifiers_minus1[ i ]; j++ ) | |
|       mcts_identifier[ i ][ j ] | ue(v) |
|     num_associated_slices_minus2[ i ] | ue(v) |
|     for( j = 0; j <= num_associated_slices_minus2[ i ]; j++ ) | |
|       output_slice_address[ i ][ j ]  ←143 | ue(v) |
|     [ ... ] | |
|   } | |
| } | |

Columns 140 span the first group; 142 spans the second group.

Fig. 3

| | Descriptor |
|---|---|
| mcts_extraction_info_set() { | |
|   num_extraction_info_sets_minus1 | ue(v) |
|   for( i = 0; i <= num_extraction_information_sets_minus1; i++ ) { | |
|     num_associated_tile_set_identifiers_minus1[ i ] | ue(v) |
|     for( j = 0; j <= num_associated_tile_set_identifiers_minus1[ i ]; j++ ) | |
|       mcts_identifier[ i ][ j ] | ue(v) |
|     num_associated_slices_minus1[ i ] | ue(v) |
|     for( j = 0; j <= num_associated_slices_minus1[ i ]; j++ ) | |
|       output_slice_order[ i ][ j ]  ←141 | ue(v) |
|     [ ... ] | |
|   } | |
| } | |

{ 140 } covers the upper portion; { 142 } covers the lower portion.

Fig. 5

ADVANCED VIDEO DATA STREAM EXTRACTION AND MULTI-RESOLUTION VIDEO TRANSMISSION

CROSS-REFERENCES TO RELATED APPLICATIONS

This application is a continuation of copending International Application No. PCT/EP2018/056788, filed Mar. 19, 2018, which is incorporated herein by reference in its entirety, and additionally claims priority from European Application No. EP 17161917.4, filed Mar. 20, 2017, which is incorporated herein by reference in its entirety.

The present application is concerned with video data stream extraction, i.e., the concept of extracting reduced video data streams from video data streams which have been appropriately prepared, so that the reduced video data stream has encoded thereinto a spatially smaller video corresponding to a spatial section of the video coded into the original video data stream, and further relates to the transmission of different video versions of one scene, the versions differing in scene resolution or fidelity.

BACKGROUND OF THE INVENTION

The HEVC standard [1] defines an hybrid video codec which allows for the definition of rectangular tile sub-arrays of the picture with respect to which the video codec obeys some coding constraints so as to allow for an easy extraction of a smaller or reduced video data stream out of the overall video data stream, namely without re-quantization and without the need for re-doing any motion compensation. As outlined in [2], it is envisaged to add to the HEVC standard syntax which allows for guiding the extraction process for a recipient of the video data stream.

However, there is still a need for rendering the extraction process more efficient.

An application area where video data extraction might be applied pertains the transmission, or provision, of several versions of one video scene, mutually differing in scene resolution. An efficient way of installing such transmission or provision of mutually different resolution versions would be advantageous.

Accordingly, it is a first object of the present invention to provide a concept for a video data stream extraction which is more efficient namely which is, for example, able to more efficiently deal with video content of a type unknown to the recipient with videos of different type differing, for instance, in view-port-to-picture-plane projection, etc., or which lessens the extraction process complexity. This object is achieved by the subject matter of the independent claims of the present application in accordance with the first aspect.

In particular, in accordance with the first aspect of the present application, video data stream extraction is made more efficient by providing the extraction information within the video data stream with information signaling one of a plurality of options, or explicitly signaling, as to how to amend the slice address of the slice portion of each slice within the spatial section extractable so as to indicate, within the reduced video data steam, the location where, in the decreased (extracted) picture area, the respective slice is located. In other words, the second information provides information to the video data stream extraction site which guides the extraction process with respect to the composition of the reduced (extracted) video data stream's spatially smaller video's pictures on the basis of the spatial section of the original video and, thus, alleviates the extraction process or renders it adaptable to a larger variability of scene types conveyed within the video data stream. With respect to the latter issue, for example, the second information may deal with various occasions where the spatially smaller video's pictures should advantageously be not just the result of pushing together potentially disjoined portions of the spatial section under maintenance of the relative arrangement, or relative order in terms of coding order, of these portions of the spatial section within the original video. For instance, at a spatial section composed of zones abutting different portions along the circumference of original pictures which show a scene in a seam interface of a panoramic scene-to-picture-plane projection, the arrangement of the zones of the spatial section in the smaller pictures of the extracted stream should be different than in case of the picture type being of non-panoramic type, but the recipient might not even know about the type. Additionally or separately, amending the slice addresses of extracted slice portions is a cumbersome task, which might be alleviated by explicitly sending information on how to amend in form of, for instance, substitute slice addresses.

Another object of the present invention is to provide a concept of providing a juxtaposition of different versions of a video scene, the versions differing in scene resolution, more efficiently to a recipient.

SUMMARY

According to an embodiment, a video data stream may have: a sequence of slice portions, each slice portion having encoded thereinto a respective slice of a plurality of slices of a picture of a video, wherein each slice portion includes a slice address indicating a location where, in a picture area of the video, the slice is located which the respective slice portion has encoded thereinto; extraction information indicating how to extract from the video data stream a reduced video data stream having encoded thereinto a spatially smaller video corresponding to a spatial section of the video by confining the video data stream to slice portions having encoded thereinto any slice within the spatial section and amending the slice address so as to relate to a decreased picture area of the spatially smaller video, the extraction information including a first information defining the spatial section within the picture area, wherein none of the plurality of slices crosses borders of the spatial section; and a second information signaling one of a plurality of options, or signalling explicitly, as to how to amend the slice address of the slice portion of each slice within the spatial section so as to indicate, within the reduced video data stream, the location where, in the decreased picture area, the respective slice is located.

According to another embodiment, an apparatus for generating a video data stream may be configured to: provide the video data stream with a sequence of slice portions, each slice portion having encoded thereinto a respective slice of a plurality of slices of a picture of a video, wherein each slice portion includes a slice address indicating a location where, in a picture area of the video, the slice which the respective slice portion has encoded thereinto is located; provide the video data stream with extraction information indicating how to extract from the video data stream a reduced video data stream having encoded thereinto a spatially smaller video corresponding to a spatial section of the video by confining the video data stream to slice portions having encoded thereinto any slice within the spatial section and amending the slice address so as to relate to a decreased picture area of the spatially smaller video, the extraction information including a first information defining the spatial section within the picture area within which the video is encoded into the video data stream independent from outside the spatial section, wherein none of the plurality of slices crosses borders of the spatial section; and a second information signaling one of a plurality of options, or explicitly signaling, as to how to amend the slice address of the slice portion of each slice within the spatial section so as to indicate, within the reduced video data stream, the location where, in the decreased picture area, the respective slice is located.

Another embodiment may have an apparatus for extracting from a video data stream having encoded thereinto the video a reduced video data stream having encoded thereinto a spatially smaller video, the video data stream including a sequence of slice portions, each slice portion having encoded thereinto a respective slice of a plurality of slices of a picture of a video, wherein each slice portion includes a slice address indicating a location where, in a picture area of the video, the slice which the respective slice portion has encoded thereinto is located, wherein the apparatus is configured to read extraction information from the video data stream, derive from the extraction information a spatial section within the picture area, wherein none of the plurality of slices crosses borders of the spatial section, and wherein the reduced video data stream is confined to slice portions having encoded thereinto any slice within the spatial section, amend the slice address of the slice portion of each slice within the spatial section using one of a plurality of options, determined out of the plurality of options using, an explicit signaling by the extraction information, so as to indicate, within the reduced video data stream, the location where, in a decreased picture area of the spatially smaller video, the respective slice is located.

Another embodiment may have a video data stream having encoded thereinto a video, wherein the video data stream includes a signalization indicating that a picture of the video shows a common scene content at different spatial portions of the picture at different resolutions.

Another embodiment may have an apparatus for processing an inventive video data stream, wherein the apparatus supports a predetermined processing task and is configured to inspect the signalization for deciding on performing or refraining from performing the predetermined processing task on the video data stream.

Another embodiment may have an apparatus for generating an inventive video data stream.

According to another embodiment, a method for generating a video data stream may have the steps of providing the video data stream with a sequence of slice portions, each slice portion having encoded thereinto a respective slice of a plurality of slices of a picture of a video, wherein each slice portion includes a slice address indicating a location where, in a picture area of the video, the slice which the respective slice portion has encoded thereinto is located; providing the video data stream with extraction information indicating how to extract from the video data stream a reduced video data stream having encoded thereinto a spatially smaller video corresponding to a spatial section of the video by confining the video data stream to slice portions having encoded thereinto any slice within the spatial section and amending the slice address so as to relate to a decreased picture area of the spatially smaller video, the extraction information including a first information defining the spatial section within the picture area within which the video is encoded into the video data stream independent from outside the spatial section, wherein none of the plurality of slices crosses borders of the spatial section; and a second information signaling one of a plurality of options, or explicitly signaling, as to how to amend the slice address of the slice portion of each slice within the spatial section so as to indicate, within the reduced video data stream, the location where, in the decreased picture area, the respective slice is located.

Another embodiment may have a method for extracting from a video data stream having encoded thereinto the video a reduced video data stream having encoded thereinto a spatially smaller video, the video data stream including a sequence of slice portions, each slice portion having encoded thereinto a respective slice of a plurality of slices of a picture of a video, wherein each slice portion includes a slice address indicating a location where, in a picture area of the video, the slice which the respective slice portion has encoded thereinto is located, method including reading extraction information from the video data stream, deriving from the extraction information a spatial section within the picture area, wherein none of the plurality of slices crosses borders of the spatial section, and wherein the reduced video data stream is confined to slice portions having encoded thereinto any slice within the spatial section, amending the slice address of the slice portion of each slice within the spatial section using one of a plurality of options, determined out of the plurality of options using, an explicit signaling by the extraction information, so as to indicate, within the reduced video data stream, the location where, in a decreased picture area of the spatially smaller video, the respective slice is located.

Another embodiment may have a method for processing an inventive video data stream, wherein the processing includes a predetermined processing task and the method involves inspecting the signalization for deciding on performing or refraining from performing the predetermined processing task on the video data stream.

Another embodiment may have a method for generating an inventive video data stream.

Another embodiment may have a non-transitory digital storage medium having a computer program stored thereon to perform the method for generating a video data stream including providing the video data stream with a sequence of slice portions, each slice portion having encoded thereinto a respective slice of a plurality of slices of a picture of a video, wherein each slice portion includes a slice address indicating a location where, in a picture area of the video, the slice which the respective slice portion has encoded thereinto is located; providing the video data stream with extraction information indicating how to extract from the video data stream a reduced video data stream having encoded thereinto a spatially smaller video corresponding to a spatial section of the video by confining the video data stream to slice portions having encoded thereinto any slice within the spatial section and amending the slice address so as to relate to a decreased picture area of the spatially smaller video, the extraction information including a first information defining the spatial section within the picture area within which the video is encoded into the video data stream independent from outside the spatial section, wherein none of the plurality of slices crosses borders of the spatial section; and a second information signaling one of a plurality of options, or explicitly signaling, as to how to amend the slice address of the slice portion of each slice within the spatial section so as to indicate, within the reduced video data stream, the location where, in the decreased picture area, the respective slice is located, when said computer program is run by a computer.

Another embodiment may have a non-transitory digital storage medium having a computer program stored thereon to perform the method for extracting from a video data stream having encoded thereinto the video a reduced video data stream having encoded thereinto a spatially smaller video, the video data stream including a sequence of slice portions, each slice portion having encoded thereinto a respective slice of a plurality of slices of a picture of a video, wherein each slice portion includes a slice address indicating a location where, in a picture area of the video, the slice which the respective slice portion has encoded thereinto is located, wherein the method includes reading extraction information from the video data stream, deriving from the extraction information a spatial section within the picture area, wherein none of the plurality of slices crosses borders of the spatial section, and wherein the reduced video data stream is confined to slice portions having encoded thereinto any slice within the spatial section, amending the slice address of the slice portion of each slice within the spatial section using one of a plurality of options, determined out of the plurality of options using, an explicit signaling by the extraction information, so as to indicate, within the reduced video data stream, the location where, in a decreased picture area of the spatially smaller video, the respective slice is located, when said computer program is run by a computer.

In particular, in accordance with the second aspect of the present application, providing a juxtaposition of several versions of a video scene, differing in scene resolution, is rendered more efficient by summarizing these versions in one video encoded into one video data stream and providing this video data stream with a signalization indicating that a picture of the video shows a common scene content at different spatial portions of the picture at different resolutions. A recipient of a video data stream is, thus, able to recognize on the basis of the signalization whether or not the video content conveyed by the video data stream pertains a spatial side-by-side collection of several versions of a scene content at different scene resolution. Depending on the capabilities at the reception site, any trial to decode the video data stream may be suppressed, or the processing of the video data stream may be adapted to an analysis of the signalization.

BRIEF DESCRIPTION OF THE DRAWINGS

Embodiments of the present invention will be detailed subsequently referring to the appended drawings, in which:

FIG. 3 shows a syntax example inheriting an example for the second information of the extraction information according to an example where second information explicitly indicates how to amend the slice addresses;

FIG. 5 shows an example for a specific syntax example including the second information according to an embodiment where the second information indicates a certain option for amending the slice addresses in the extraction process among several possible options;

DETAILED DESCRIPTION OF THE INVENTION

The following description starts with a description of the first aspect of the present application and then continues with a description of the second aspect of the present application. To be more precise, as to the first aspect of the present application, the description starts with a brief overview of the underlying technical problem in order to motivate the advantages and underlying concept of the embodiments of the first aspect described thereinafter. With respect to the second aspect, the description order is chosen in the same way.

In panorama or 360 video applications, it is typical that only a subsection of the picture plane needs to be presented to the user. Certain codec tools like Motion Constrained Tile Sets (MCTS) allow to extract the coded data corresponding to the desired picture subsection in the compressed domain and form a conformant bitstream that can be decoded by legacy decoder devices that do not support MCTS decoding out of a complete picture bitstream and that could be characterized as being lower tier compared to the decoder for complete picture decoding.

As example and for reference, the involved signaling in the HEVC codec can be found in Reference [1], which specifies the temporal MCTS SEI message in Section D.2.29 and E.2.29 that allows an encoder to signal that a given list of rectangles, each defined by its top left and bottom right tile index, belong to an MCTS.

Reference [2], which provides additional information such as parameter sets and nested SEI messages that ease the effort to extract an MCTS as a conformant HEVC bitstream and is to be added to the next version of [1].

As can be seen from [1] and [2], the procedures for extraction includes adjustment to the slice addresses signaled in the slice headers of involved slices which is carried out in the extractor device.

Figure 1:
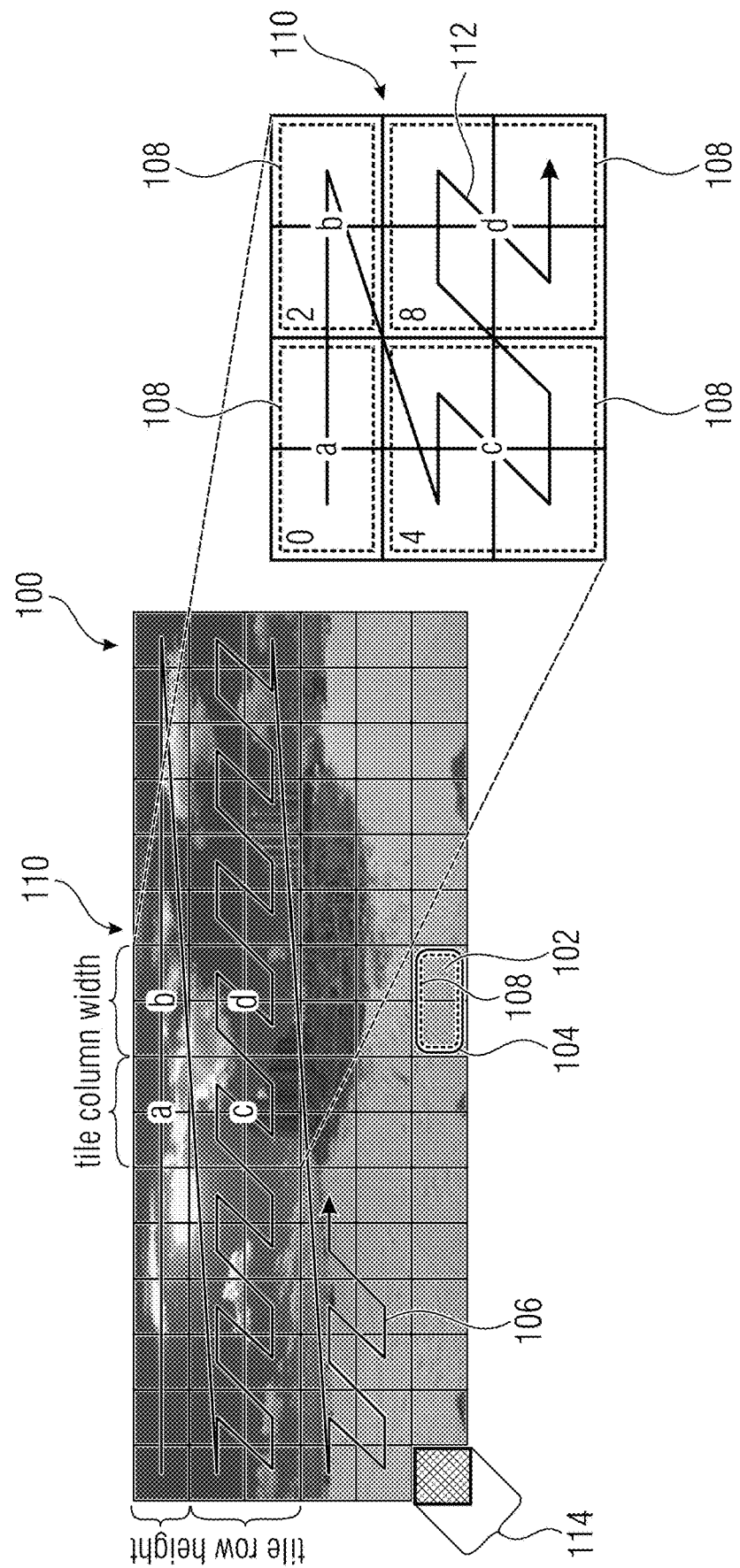
FIG. 1 shows a schematic diagram illustrating MCTS extraction with adjusted slice addresses.

FIG. 1 shows an example for MCTS extraction. FIG. 1 shows a picture which has been coded into a video data stream, namely an HEVC video data stream. Picture 100 is subdivided into CTBs, i.e., coding tree blocks in units of which the picture 100 has been encoded. In the example of FIG. 1, picture 100 is subdivided into 16×6 CTBs but the number of CTB rows and the number of CTB columns is, naturally, not critical. Reference sign 102 representatively indicates such a CTB. In units of these CTBs 102, picture 100 is further subdivided into tiles, namely an array of m×n tiles with FIG. 1 showing the exemplary case of m=8 and n=4. In each tile the reference sign 104 has been used to representatively indicate one such tile. Each tile is, thus, a rectangular cluster or sub-array of CTBs 102. For sake of illustration only, FIG. 1 shows that tiles 104 may be of differing size or, alternatively speaking, that the rows of tiles may be of mutually different height and column of tiles of mutually different width, respectively.

As is known in the art, the tile subdivisioning, i.e., the subdivisioning of picture 100 into tiles 104, influences the coding order 106 along which the picture content of picture 100 is encoded into the video data stream. In particular, the tiles 104 are traversed one after the other along a tile order, namely in a tile-row-wise raster scan order. In other words, all CTBs 102 within one tile 104 are coded or traversed by the coding order 106 first before the coding order proceeds to the next tile 104. Within each tile 102, the CTBs are coded also using a raster scan order, i.e. using a row-wise raster scan order. Along coding order 106, the coding of picture 100 into the video data stream is subdivided in order to result in so-called slice portions. In other words, slices of picture 100 traversed by a continuous fraction of coding order 106 are coded into the video data stream as a unit so as to form a slice portion. In FIG. 1, it is assumed that each tile resides within a single slice or, in the terminology of HEVC, slice segment, but this is merely an example and could be made in a different manner. Representatively, one slice 108 or, in terms of HEVC, one slice segment, is indicated in FIG. 1 with reference sign 108 representatively and it coincides, or is conformed to, the corresponding tile 104.

As far as the coding of picture 100 into the video data stream is concerned, it should be noted that this coding exploits spatial prediction, temporal prediction, context derivation for entropy coding, motion-compensation for temporal prediction and transforming a prediction residual and/or quantizing a prediction residual. The coding order 106 not only influences the slicing but also defines the availability of reference basis for sake of spatial prediction and/or context derivation: Merely those neighboring portions are available which precede in coding order 106. The tiling not only influences the coding order 106 but also restricts coding-inter-dependencies within picture 100: For instance, spatial prediction and/or context derivation is restricted to refer to portions within the current tile 104 only. Portions outside the current tile are not referred to in spatial prediction and/or context derivation.

FIG. 1 now shows a further specific area of picture 100, namely a so-called MCTS, i.e., a spatial section 110 within the picture area of picture 100 with respect to which the video, which picture 100 is part of, is extractable. An enlarged representation of section 110 is shown in FIG. 10 on the right-hand side. MCTS 110 of FIG. 1 is composed of a set of tiles 104. The tiles residing in section 110 have each been provided with a name, namely a, b, c and d. The fact that spatial section 110 is extractable involves a further restriction with respect to the coding of the video into the video data stream. In particular, the partitioning of pictures of the video as shown in FIG. 1 for picture 100 is adopted by other pictures of the video, and for this picture sequence the picture content within tiles a, b, c and d is coded in a manner so that coding-interdependencies remain within spatial section 110 even when referencing from one picture to the other. In other words, for instance, temporal prediction and temporal context derivation is restricted in a manner so as to keep within the area of spatial section 110.

An interesting point in the coding of the video, which picture 100 is part of, into the video data stream is the fact that the slices 108 are provided with a slice address which indicates the coding start thereof, i.e., the position thereof, in the coded picture area. Slice addresses are assigned along coding order 106. For instance, slice addresses indicate the CTB rank along coding order 106 at which the coding of the respective slice starts. For instance, within the data stream coding the video and picture 100, respectively, the slice portion carrying the slice coinciding with tile a would have slice address 7 as the seventh CTB in coding order 106 representing the first CTB in coding order 106 within the tile a. In a similar manner, the slice addresses within slice portions carrying the slices relating to tiles b, c and d would be 9, 29 and 33, respectively.

The right-hand side of FIG. 1 indicates the slice addresses which a recipient of the reduced or extracted video data stream assigns two slices corresponding to tiles a, b, c and d. In other words, FIG. 1 illustrates at the right-hand side using digits 0, 2, 4 and 8 the slice addresses which are assigned by a recipient of the reduced or extracted video data stream which has been obtained from the original video data stream representing the video containing whole picture 100 by extraction with respect to spatial section 110, i.e., by MCTS extraction. In the reduced or extracted video data stream, the slice portions having encoded thereinto slices 100 of tiles a, b, c and d are arranged in coding order 106 just as they were in the original video data stream from which they have been taken during the extraction process. In particular, this recipient places the picture content in the form of CTBs reconstructed from the sequence of slice portions in the reduced or extracted video data stream, namely the slices concerning tiles a, b, c and d, along a coding order 112 which traverses the spatial section 110 in the same manner as coding order 106 with respect to the whole picture 100, namely by traversing spatial section 110 tile by tile in a raster scan order, and traversing CTBs within each tile also along a raster scan order before proceeding with the next tile. The relative positions of tiles a, b, c and d is maintained. That is, spatial section 110 as shown in FIG. 1 at the right-hand side maintains the relative position among tiles a, b, c and d as they occurred in picture 100. The slice addresses of slices corresponding to tiles a, b, c and d resulting from determining same using coding order 112 is 0, 2, 4 and 8, respectively. The recipient is, thus, able to reconstruct a smaller video on the basis of the reduced or extracted video data stream showing spatial section 110 as shown at the right-hand side as self-contained pictures.

Summarizing the description of FIG. 1 so far, FIG. 1 shows or illustrates the adjustment of slice addresses and units of CTB after extraction by using digits at the top left corner of each slice 108. In order to carry out the extraction, the extraction site or extractor device may be used to analyze the original video data stream with respect to a parameter indicating the size of the CTBs, i.e., max CTB size, 114 as well as the number and size of tile column and tile rows within picture 100. Further, the nested MCTS-specific sequence and picture parameter sets are inspected in order to derive therefrom the output arrangement of tiles. In FIG. 1, the tiles a, b, c and d within spatial section 110 retain their relative arrangement. Altogether, the analysis and inspections described above and to be performed by an extractor device following the MCTS instructions of an HEVC data stream used a dedicated and sophisticated logic to derive the slice address of the reconstructed slices 108 from the above listed parameters. This dedicated and sophisticated logic, in turn, incurs additional implementation cost as well as run time disadvantages.

The embodiments described below, therefore, use additional signaling in the video data stream and corresponding processing steps at extraction information generation side as well as extraction side which enable to lessen the overall processing burden for the just explained derivation of the extractor device by providing readily available information for the specific purpose of the extraction. Additionally or alternatively, some embodiments described below use the additional signaling in order to guide the extraction process in a manner so that a more effective handling of different types of video content is achieved.

Figure 2:
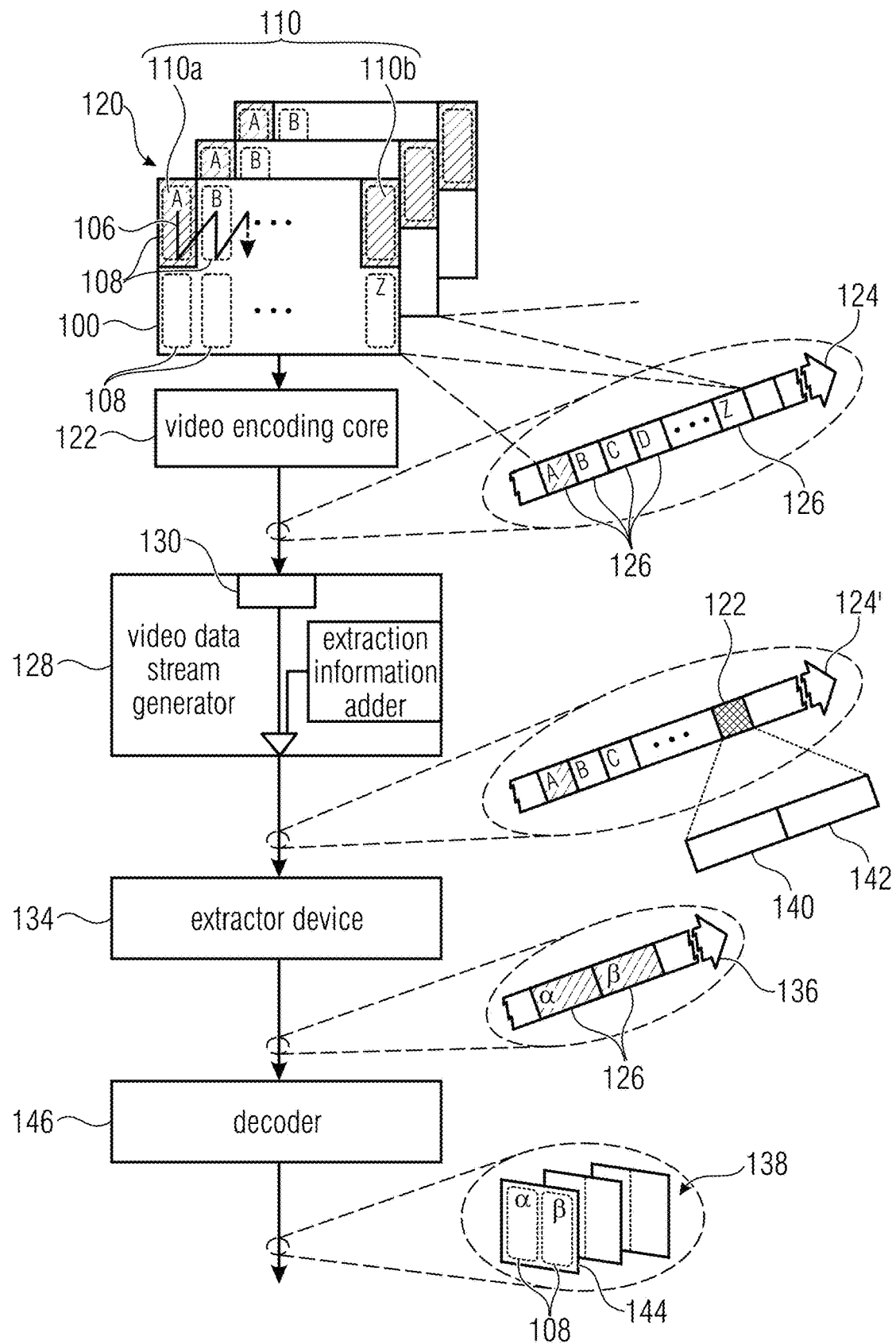
FIG. 2 shows a mixed schematic and block diagram illustrating a concept of video data stream extraction handling in accordance with embodiments of a first aspect of the present application as well as the participating processes and devices.

On the basis of FIG. 2, the general concept is explained first. Later-on, this general description of mode of operations of the individual entities participating in the overall process shown in FIG. 2, is further specified in different manner in accordance with different embodiment further below. It should be noted that though described together in one figure for ease of understanding the entities and blocks shown therein pertain self-contained devices each which, individually, inheriting features providing the advantages outline in FIG. 2 as a whole. To be more precise, FIG. 2 shows the generation process of generating a video data stream, providing such a video data stream with extraction information, the extraction process itself followed by the decoding of the extracted or reduced video data stream as well as the participating devices, wherein the mode of operation of these device or the performance of the individual tasks and steps is in accordance with the embodiment described now. In accordance with the specific implementation example described first with respect to FIG. 2, and as further outlined below, the processing overhead associated with the extraction task of extractor device is reduced. In accordance with further embodiments, the handling of various different types of video content within the original video is alleviated additionally or alternatively.

At the top of FIG. 2 an original video is shown indicated by reference sign 120. This video 120 is composed of a sequence of pictures one of which is indicated using reference sign 100 as it plays the same role as picture 100 in FIG. 1, i.e., it is a picture showing the picture area out of which a spatial section 110 is to be cutout later on by video data stream extraction. It should be understood, however, that the tile subdivisioning, explained above with respect to FIG. 1, does not need to be used by the video encoding underlying the processes shown in FIG. 2 and that, rather, tiles and CTBs represent semantic entities in the video encoding which are merely optional as far as the embodiments of FIG. 2 are concerned.

FIG. 2 shows that the video 102 is subject to a video encoding in a video encoding core 122. The video encoding performed by video encoding core 122 turns video 120 into a video data stream 124 using, for example, hybrid video coding. That is, video encoding core 122 uses, for example, block-based predictive coding with coding individual picture blocks of the pictures of video 120 using one of several supported prediction modes encoding of the prediction residual. The prediction modes may, for example, include spatial and temporal prediction. The temporal prediction may involve motion compensation, i.e., the determination of a motion field which manifests itself in a motion vector for temporally predicted blocks and a transmission thereof with data stream 124. The prediction residual may be transform-coded. That is, some spectral decomposition may be applied to the prediction residual and the resulting spectral coefficients may be subject to quantization and losslessly coded into data stream 124 using, for instance, entropy coding. The entropy coding, in turn, may use context adaptivity, that is a context may be determined wherein this context derivation may depend on a spatial neighborhood and/or temporal neighborhood. As indicated above, the encoding may be based on a coding order 106 which restricts the coding dependencies to the extent that merely portions of the video already traversed by the coding order 106 may be used as a basis or reference for coding a current portion of the video 120. The coding order 106 traverses the video 120 picture by picture but not necessarily in presentation time order of the pictures. Within the pictures, such as picture 100, video encoding core 120 subdivides the coded data obtained by the video encoding, thereby subdividing picture 100 into slices 108 each of which corresponds to a corresponding slice portion 126 of video data stream 124. Within data stream 124 the slice portions 126 form a sequence of slice portions following each other in the order at which the corresponding slices 108 are traversed by coding order 106 in picture 100.

As also indicated in FIG. 2, video encoding core 122 provides, or codes into, each slice portion 126 a slice address. The slice addresses are, for illustration purposes, indicated in FIG. 2 by way of capital letters. As described with respect to FIG. 1, the slice addresses may be determined in some appropriate unit such as in units of CTBs one-dimensionally along coding order 106 but they may alternatively be determined differently relative to some predetermined point within the picture area spent by the pictures of video 120 such as, for instance, the top left corner of picture 100.

Thus, video encoding core 122 receives a video 120 and outputs a video data stream 124.

As already outlined above, the video data stream generated in accordance with FIG. 2 will be extractable as far as spatial section 110 is concerned and, accordingly, video encoding core 120 adapts the video encoding process suitably. To this end, video encoding core 122 restricts inter-coding dependencies so that portions within spatial section 110 are encoded into video data stream 124 in a manner so as to not depend on portions outside section 110 by way of, for example, spatial prediction, temporal prediction or context derivation. The slices 108 do not cross the borders of section 110. Each slice 108 is, thus, either completely within section 110 or completely outside thereof. It should be noted that video encoding core 122 may obey not only one spatial section 110 but several spatial sections. These spatial sections may intersect each other, i.e., same may overlap partially or one spatial section may be completely within another spatial section. Owing to these measures, it is, as will be explained in more detail later on, possible to extract from video data stream 124 a reduced or extracted video data stream of smaller pictures than pictures of video 120, namely pictures merely showing the content within spatial section 110 without re-encoding, i.e., complicated tasks such as motion compensation, quantization and/or entropy coding, do not need to be performed again.

The video data stream 124 is received by a video data stream generator 128. In particular, in accordance with the embodiments shown in FIG. 2, video data stream generator 128 comprises a receiving interface 130 which receives the prepared video data stream 124 from video encoding core 122. It should be noted that, according to an alternative, the video encoding core 122 could be included in video data stream generator 128, thereby replacing interface 130.

The video data stream generator 128 provides the video data stream 124 with extraction information 132. In FIG. 2, the resulting video data stream output by video data stream generator 128 is indicated using reference sign 124'. The extraction information 132 indicates, for an extractor device shown in FIG. 2 with reference sign 134, as to how to extract from video data stream 124' a reduced or extracted video data stream 136 having encoded thereinto a spatially smaller video 138 corresponding to the spatial section 110. The extraction information 132 comprises first information 140 which defines the spatial section 110 within the picture area sent by picture 100 and second information 142 which signals one of a plurality of options as to how to amend the slice address of the slice portion 126 of each slice 108 falling into spatial section 110 so as to indicate, within the reduced video data stream 136, the location where, in the decreased picture area of the pictures 144 of video 138, the respective slice is located.

In other words, the video data stream generator 128 merely accompanies, i.e., adds, something to video data stream 124 in order to result into video data stream 124', namely extraction information 132. This extraction information 132 is intended to guide extractor device 134 which should receive video data stream 124', in extracting the reduced or extracted video data stream 136 specifically with respect to section 110 from this video data stream 124'. The first information 140 defines the spatial section 110, i.e., its location within the picture area of video 120 and picture 100, respectively, and, possibly, the size and shape of picture area of pictures 144. As illustrated in FIG. 2, this section 110 does not necessarily need to be rectangular, convex or does not need to be a connected area. In the example of FIG. 2, for instance, section 110 is composed of two disjoined partial areas 110a and 110b. Additionally, first information 140 may contain hints as to how extractor device 134 should modify or replace some of the coding parameters or portions of data stream 124 or 124', respectively, such as a picture size parameter which is to be adapted to reflect to change in picture area from pictures 100 towards pictures 144 by way of the extraction. In particular, first information 140 may comprise substitutes or modification instructions with respect to parameter sets of video data stream 124' which are applied by extractor device 134 in the extraction process so as to correspondingly modify or replace corresponding parameter sets contained in video data stream 124' and taken over into reduced or extracted video data stream 136.

In other words, extractor device 134 receives video data stream 124', reads the extraction information 132 from the video data stream 124' and derives from the extraction information the spatial section 110, namely its position and location within the picture area of video 120, namely on the basis of the first information 140. On the basis of the first information 140 the extractor device 130, thus, identifies those slice portions 126 which have encoded thereinto slices which fall into section 110 and, thus, are to be taken over into reduced or extracted video data stream 136 while slice portions 126 pertaining slices outside section 110 are dropped by extractor device 134. Additionally, extractor device 134 may use information 140 so as to, as just outlined, correctly set one or more parameter sets within data stream 124' before, or in, adopting same in the reduced or extracted video data stream 136, namely by modification or replacement. The one or more parameter sets, thus, may pertain a picture size parameter which may, according to information 140 set to a size corresponding to a sum of sizes of an area of section 110, i.e. a sum of the area of all portions 110a and 110b of section 110 if section 110 is not a connected area as exemplarily depicted in FIG. 2. The section-110-sensitive dropping of slice portions along with the parameter set adaptation confines the video data stream 124' to section 110. Additionally, extractor device 134 amends the slice addresses of the slice portions 126 within reduced or extracted video data stream 136. These slices are illustrated using hedging in FIG. 2. That is, the hatched slice portions 126 are those the slices of which fall into section 110 and are, thus, extracted or taken over, respectively.

It should be noted that information 142 is not only imaginable in situations where same is added to the complete video data stream 124' the sequence of slice portions comprised by which comprises slice portions having encoded thereinto a slice within the spatial section as well as slice portions having encoded thereinto a slice external to the spatial section. Rather, the data stream containing information 142 could have already been stripped so that the sequence of slice portions comprised by the video data stream comprise slice portions having encoded thereinto a slice within the spatial section, but is free of slice portions having encoded thereinto a slice external to the spatial section.

In the following, different examples for embedding second information 142 into data stream 124' are presented, and the processing thereof. Generally, second information 142 is conveyed within data stream 124' as a signalization which signals explicitly or in form of a choice of one of several options, a hint as to how perform the slice address amendment. In other words, the second information 142 is conveyed in the form of one or more syntax elements, the possible values of which may, for instance, explicitly signal slice address substitutes or may, together, allow for distinguishing a signalization of a multitude of possibilities to associate a slice address per slice portion 126 in video data stream 136, with the setting of the one or more syntax elements in the data stream choosing one. It should be noted, however, that the number of meaningful or allowed settings of the just mentioned one or more syntax elements embodying the second information 142 depends on the way video 120 has been encoded into video data stream 124 and the selection of section 110, respectively. Imagine, for instance, that section 110 was a rectangular connected area within picture 100 and that video encoding core 120 would perform the encoding with respect to this section without further restricting the encoding as far as the inside of section 110 is concerned. No composition of section 110 by two or more regions 110a and 110b would apply. That is, merely dependencies to the outside of section 110 would be suppressed. In this case, section 110 would have to be mapped onto the picture area of pictures 144 of video 138 unamended, i.e. without scrambling positions of any sub-regions of section 110 and the assignment of addresses α and β to the slice portions carrying the slices making-up section 110 would be uniquely determined by placing the inner of section 110 into the picture area of picture 144 as it is. In this case, the setting of information 142 generated by video data stream generator 128 would be unique, i.e., a video data stream generator 128 would have no other choice than setting information 142 in this way, although information 142 would have other signalization options from a coding perspective available. Even in this alternative-less case, however, the signalization 142 explicitly indicating, for instance, the unique slice address amendment is advantageous in that the extractor device 134 does not have to perform the aforementioned cumbersome task of determining the slice addresses α and β for slice portions 126 adopted from stream 124' by itself. Rather, it simply derives how to amend the slice addresses of slice portions 126 from information 142.

Depending on the different embodiments for the nature of information 142 further outlined below, extractor device 134 either conserves or maintains the order at which slice portions 126 are taken over from stream 124' into reduced or extracted stream 136 or amends the order in a manner defined by information 142. In any case, the reduced or extracted data stream 136 output by extractor device 134 may be decoded by a normal decoder 146. The decoder 146 receives the extractor video data stream 136 and decodes therefrom a video 138, the pictures 134 of which are smaller than pictures of video 120 such as picture 100, and the picture area of which is filled by placing the slices 108 decoded from the slice portions 126 within video data stream 136 in the manner defined by the slice addresses α and β conveyed within the slice portions 126 within video data stream 136.

That is, so far, FIG. 2 has been described in a manner so that the description thereof fits to various embodiments for the exact nature of the second information 142 described in more detail below.

The embodiment described now uses an explicit signalization of the slice addresses which should be used by extractor device 134 in amending the slice addresses of the slice portions 126 taken over from stream 142 into stream 136. Embodiments described thereinafter use a signalization 142 which allows for signaling to extractor device 134 one of several allowed options of how to amend the slice addresses. The allowance of the options as a result of the section 110 having been encoded, for instance, in a manner restricting the coding-inter-dependencies in the inner of section 110 so as to not cross spatial borders of section 110 which, in turn, divide section 110 into two or more regions such as 110a and 110c or tiles a, b, c, d as illustrated in FIG. 1. The latter embodiments may still involve the extractor device 134 to perform the cumbersome task of computing the addresses by itself, but allow for the efficient handing of different types of picture content within the original video 120 so as to result into a meaningful video 138 on the reception side on the basis of the corresponding extracted or reduced video data stream 136.

That is, as outlined above with respect to FIG. 1, the cumbersome task of slice address determination in extractor device 134 is alleviated in accordance with an embodiment of the present application by way of an explicit transmission of how the addresses are to be amended in the extraction process by way of the second information 142. A specific example for a syntax which could be used to this end is set out below.

In particular, information 142 could be used to explicitly signal the new slice addresses to be used in the slice headers of the extracted MCTS by comprising a list of slice address substitutes contained in stream 124' in the same order in which slices portions 126 are carried in the bit stream 124'. See, for instance, the example in FIG. 1. Here, information 142 would be an explicit signaling of the slice addresses following the order of the slice addresses 124' in the bit stream. Once again, the slices 108 and the corresponding slice portions 126 might be taken over in the extraction process so that the order in the extracted video data stream 136 corresponds to the order at which these slice portions 126 were contained in video data stream 124'. In accordance with the subsequent syntax example, information 142 explicitly signals slice addresses in a manner starting from the second slice or slice portions 126 onwards. In the case of FIG. 1, this explicit signaling would correspond to the second information 142 indicating or signaling a list {2, 4, 8}. An exemplary syntax for this embodiment is presented in the syntax example of FIG. 3 which shows, by way of highlighting, the corresponding addition of the explicit signaling 142 in addition to the MCTS extraction information SEI known from [2].

The semantics are set out below.

num_associated_slices_minus2[i] plus 2 indicates the number of slices containing the MCTS with mcts identifier equal to any value of the list mcts_identifier[i][j]. The value of num_extraction_info_sets_minus1[i] shall be in the range of 0 to $2^{32}-2$, inclusive.

output_slice_address[i][j] identifies the slice address of the j-th slice in bitstream order belonging to the MCTS with mcts identifier equal to any value within the list mcts_identifier[i][j]. The value of output_slice_address[i][j] shall be in the range of 0 to $2^{32}-2$, inclusive.

It should be noted that the presence of information 142 within an MCTS extraction information SEI or in addition to MTCS related information 140 could be controlled by a flag in the data stream. This flag could be named slice_reordering_enabled_flag or the like. If set, information 142, such as num_associated_slices_minus2 and output_slice_address, is present in addition to the information 140, if not, information 142 is not-present and the mutual locational arrangement of the slices is adhered to in the extraction process or handled otherwise.

Further, is should be noted that using the nomenclature of H.265/HEVC, the portion "_segment_" in in syntax element names used in FIG. 3 could alternatively be replaced by "_segment_address_", but the technical content remains the same.

And even further, is should be noted that although num_associated_slices_minus2 suggests that information 142 indicates the number of slices within section 110 in form of an integer indicating this number in form of a difference to two, the number of slices within section 110 could alternatively by signaled in the data stream directly or as a difference to one. For the latter alternative num_associated_slices_minus1 would, for example, be used as syntax element name instead. Note that the number of slices within any section 110 could, for instance, also be allowed to be one.

In addition to the MCTS extraction process anticipated so far in [2], additional processing steps are associated with the explicit signalization by way of information 142 as embodied in FIG. 3. These additional processing steps facilitate the slice address derivation within the extraction process to be performed by extractor device 134 and the following outline of this extraction process shows, by underlining, as to where the facilitation takes place:

Let a bitstream inBitstream, a target MCTS identifier mctsIdTarget, target MCTS extraction information set identifier mctsEISIdTarget and a target highest TemporalId value mctsTIdTarget be the inputs to the sub-bitstream MCTS extraction process.

The output of the sub-bitstream MCTS extraction process is a sub-bitstream outBitstream. It is a requirement of bitstream conformance for the output bitstream that any output sub-bitstream that is the output of the process specified in this clause with the bitstream shall be a conforming Bitstream.

The output sub-bitstream is derived as follows:

The bitstream outBitstream is set to be identical to the bitstream inBitstream.

Remove from outBitstream all NAL units with TemporalId greater than mctsTIdTarget.

For each remaining VCL NAL of each access unit units in outBitstream, adjust the slice segment header as follows:

For the first VCL NAL unit, set the value of first_slice_segment_in_pic_flag equal to 1, otherwise 0.

Set the value of slice_segment_address of the non-first NAL units (i.e., slices) starting with the second in bitstream order according to the list output_slice_address[i][j].

The embodiment variant just described with respect to FIGS. 1 to 3 alleviated the cumbersome task of slice address determination and the extraction process to be performed by extractor device 134 by using information 142 as an explicit signalization of slice addresses. According to the specific example of FIG. 3, information contained a substitute slice address 143 merely for every second and following slice portion 126 in slice portion order, with maintaining the slice order in taking over the slice portions 126 pertaining to slices 108 within section 110 from data stream 124' into data stream 136. The slice address substitutes relate to the one-dimensional slice address assignment in the picture area of pictures 144 in video 138, respectively, using order 112 and do not conflict with simply paving the picture area of pictures 144 along order 112 using the sequence of slices 108 obtained from the sequence of slice portions taken over. It should be noted, and will also be mentioned further below, that the explicit signalization may also be applied to the first slice address, i.e., to the slice address of the first slice portion 126. Even for the latter, a substitute 143 might be contained in formation 142. Such signalization for information 142 could also enable placing of slices 108 corresponding to the first, in the order within stream 124', slice portion 126 among the slice portions 126 carrying a slice 108 within section 110, somewhere else other than at the start position of coding order 112 which may be, as depicted in FIG. 1, the upper left picture corner. Insofar as the explicit signaling of slice addresses could also be used to allow for a greater freedom in rearranging sectional regions 110a and 110b, if such a possibility exists or is allowed. For instance, in modifying the example depicted in FIG. 3 in that information 142 also explicitly signals the slice address substitute 143 for the first slice portion 126 within data stream 136, i.e., α and β in the case of FIG. 2, then signalization 142 would enable distinguishing two allowed or available placements of sectional regions 110a and 110b within the output pictures of video 138, namely, one where sectional region 110a is placed on the left-hand side of the picture, thereby leaving the slice 108 corresponding to the firstly transmitted slice portion 126 within data stream 136 at the start position of coding order 112 and maintaining the order among slices 108 compared to the slice order in picture 100 of video 120 as far as video data stream 124 is concerned, and one where sectional region 120a is placed on the right-hand side of the picture 144, thereby changing the order of the slices 108 within picture 144 traversed by coding order 112 compared to the order the same slices are traversed in the original video within video data stream 124 by coding order 106. The signalization 142 would explicitly signal the slice addresses to be used for amendment by extractor device 134 as a list of slice addresses 143, ordered or assigned to the slice portions 126 within the video data stream 124'. That is, information 142 would indicate the slice addresses sequentially for each slice within section 110 in the order these slices 108 would be traversed by coding order 106 and this explicit signalization may then lead to a permutation in such a way that the sectional regions 110a and 110b of section 110 change the order at which they are traversed by order 112 compared to the order at which same were traversed by the original coding order 106. The slice portions 126 taken over from stream 124' into stream 136 would be re-ordered by extractor device 134 accordingly, i.e. so as to conform to order the slices 108 of extracted slice portions 126 are sequentially traversed by the order 112. Standard conformance of the reduced or extracted video data stream 136 according to which the slice portions 126, taken over from the video data stream 124', should strictly follow each other along coding order 112, i.e., with monotonically increasing slice addresses α and β as amended by extractor device 134 in the extraction process, would thus be maintained. Extractor device 134 would, thus, amend the order among the taken-over slice portions 126 so as to order the taken-over slice portions 126 according to the order of the slices 108 encoded thereinto along the coding order 112.

The latter aspect, namely the possibility of rearranging slices 108 of slices portions 126 taken over, is exploited in accordance with a further variant of the description of FIG. 2. Here, the second information 142 signals a re-arrangement of the order among the slice portions 126 having encoded thereinto any slice 108 within section 110. Explicit signaling slice address substitutes 143 in a manner resulting in a re-arrangement of slice portions is one possibility for this presently described embodiment. Re-arrangement of slice portions 126 within the extracted or reduced video data stream 136 may be signaled by information 142 in a different manner though. The present embodiment ends-up in decoder 146 placing the reconstructed slices reconstructed from slice portions 126 strictly along the coding order 112, which means, for instance, using the tile raster scan order, thereby filling the picture area of pictures 144. The re-arrangement signaled by signalization 142 has been selected in a manner so as to rearrange or change the order among the extracted or taken over slice portions 126 such that the placement by decoder 146 may possibly result in sectional regions such as regions 110a and 110b changing their order compared to non-reordering the slice portions. If the re-arrangement signaled by information 142 leaves the order as it was originally in data stream 124', then the sectional regions 110a and 110b may maintain the relative positions as they were in the original picture area of pictures 110.

Figure 4:
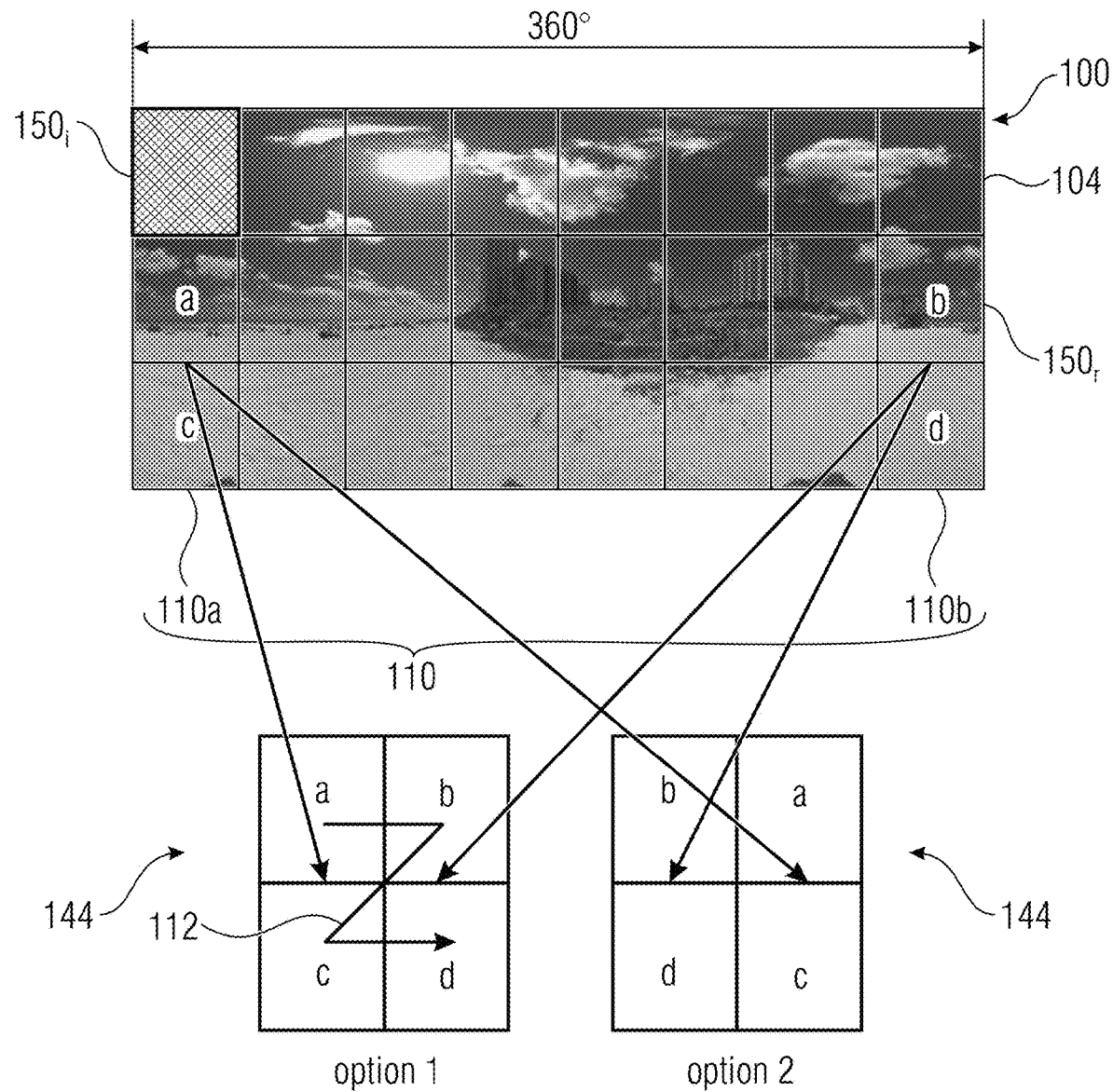
FIG. 4 shows a schematic diagram illustrating an example for a non-adjacent MCTS forming a desired picture subsection.

In order to explain the current variant, reference is made to FIG. 4. FIG. 4 shows picture 110 of the original video and the picture area of the picture 144 of the extracted video. Moreover, FIG. 4 shows an exemplary tile-partitioning into tiles 104 and an exemplary extraction section 110 composed of two disjoint sectional regions or zones 110a and 110b, namely, sectional regions 110a and 110b adjacent to opposite sides $150_r$ and $150_l$ of picture 110, here, coinciding in their positions as far as the extraction direction of sides $150_r$ and $150_l$ is concerned, namely, along the vertical direction. In particular, FIG. 4 illustrates that the picture content of picture 110 and, thus, the video which picture 110 is part of, is of a certain type, namely, a panoramic video so that sides $150_r$ and $150_l$ form a scene in projecting the 3D scene onto a picture area of picture 110. Below picture 110, FIG. 4 shows two options of how to place sections 110a and 110b within the output picture area of picture 144 of the extracted video. Again, tile names are used in FIG. 4 in order to illustrate the two options. The two options result from the video 210 having been coded into stream 124 in a manner so that the coding takes place independent from outside with respect to each of the two regions 110a and 110b. It should be noted that in addition to the two allowed options shown in FIG. 4, there might be two further options if each of zones 110a and 110b were subdivided into two tiles within each of which, in turn, the video is encoded into stream 124 independently from outside, i.e. if each tile in FIG. 4 was an extractible or independently coded (with respect to spatial and temporal interdependencies) portion by itself. Then the two options correspond to differently scrambling the tiles a, b, c and d in section 110.

Again, the embodiment, which is now described with respect to FIG. 4, aims at having second information 142 changing the order at which slices 108 or NAL units of data stream 124' which carry the slices 108, are to be transferred or adopted or written into from data stream 124' towards the extracted or reduced video data stream 136 during the extraction process by extraction device 134. FIG. 4 illustrates the case where the desired picture sub-section 110 does consist of non-adjacent tiles or sectional regions 110a and 110b within the picture plane spanned by picture 110. This complete coded picture plane of picture 110 is shown in FIG. 4 at the top with its tiled boundaries with a desired MCTS 110 consisting of two rectangles 110a and 110b including tiles a, b, c and d. As far as the scene content is concerned, or owing to the fact that the video content shown in FIG. 4 is a panoramic video content, the desired MCTS 110 wraps around the left and right boundary $150_r$ and $150_l$ as the picture 110 covers the camera surroundings over 360° by means of an, here exemplarily illustrated, equirectangular projection. In other words, owing to the illustrated case of FIG. 4 where the picture content is a panoramic content, among options 1 and 2 of placement of sectional regions 110a and 110b within picture area of output pictures 144, the second option would actually make more sense. Things could be different, however, if the picture content was of another type such as non-panoramic.

In other words, the order of tiles A, B, C and D in the complete picture bit stream 124' is {a, b, c, d}. If this order would simply be transferred onto the coding order in the extracted or reduced video data stream 136 or in the placement of the corresponding tiles in the output picture 144, the extraction process would not result in a desirable data arrangement within the output bit stream 136 in the above exemplary case by itself as shown on the bottom left of FIG. 4. As shown at the bottom right of FIG. 4, the advantageous arrangement {b, a, d, c} is shown which results in a video bit stream 136 that yields continuous picture content over the picture plane of picture 144 for legacy devices such as decoder 146. Such a legacy device 146 may not have the capability of rearranging sub-picture areas of the output picture 144 as a post-processing step in the pixel domain after decoding, i.e., rendering, and even sophisticated devices may be advantageous to avoid a post-processing effort.

Thus, in accordance with an example motivated above with respect to FIG. 4, the second information 142 provides a means for the encoding side of video data stream generator 128, respectively, to signal, among several choices or options, an advantageous order in which sectional regions 110a, 110b, composed of, for example, sets of one or more tiles each, within a video data stream 124', should be arranged in an extracted or reduced video data stream 136 or its picture area spanned by its pictures 144. In accordance with the specific syntax example presented in FIG. 5, the second information 142 comprises a list which is coded into data stream 124' and indicates the position of each slice 108 falling into section 110 within the extracted bit stream in the original or input bit stream order, i.e., in the order of their occurrence in bit stream 124'. For example, in the example of FIG. 4, the advantageous option 2 would end up as a list that reads {1, 0, 3, 2}. FIG. 5 illustrates a concrete example for a syntax which contains the second information 142 within the MCTS extraction information set SEI message.

The semantics would be as follows.

num_associated_slices_minus1[i] plus 1 indicates the number of slices containing the MCTS with mcts identifier equal to any value of the list mcts_identifier[i][j]. The value of num_extraction_info_sets_minus1[i] shall be in the range of 0 to $2^{32}-2$, inclusive.

output_slice_order[i][j] identifies the absolute position of the j-th slice in bit stream order belonging to the MCTS with mcts identifier equal to any value within the list mcts_iden-tifier[i][j] in the output bit stream. The value of output_slice_order[i][j] shall be in the range of 0 to $2^{23}-2$, inclusive.

Additional processing steps in the extraction process defined in [2] are described next and facilitate the understanding of the signaling embodiment of FIG. 5, wherein additions relative to [2] are highlighted by underlining:

Let a bitstream inBitstream, a target MCTS identifier mctsIdTarget, target MCTS extraction information set identifier mctsEISIdTarget and a target highest TemporalId value mctsTIdTarget be the inputs to the sub bit stream MCTS extraction process.

The output of the sub bit stream MCTS extraction process is a sub bit stream outBitstream. It is a requirement of bit stream conformance for the input bit stream that any output sub bit stream that is the output of the process specified in this clause with the bit stream shall be a conforming bit stream.

OutputSliceOrder[j] is derived from the list output_slice_order[i][j] for the i-th extraction information set.

The output sub bit stream is derived as follows:
  The bit stream outBitstream is set to be identical to the bit stream inBitstream. [ . . . ]
  Remove from outBitstream all NAL units with TemporalId greater than mctsTIdTarget.
  Sort the NAL units of each access unit according to the list OutputSliceOrder[j].
  For each remaining VCL NAL units in outBitstream, adjust the slice segment header as follows:
    For the first VCL NAL unit within each access unit, set the value of first_slice_segment_in_pic_flag equal to 1, otherwise 0.
    Set the value of slice_segment_address according to the tile setup defined in the PPS with pps_pic_parameter_set_id equal to slice_pic_parameter_set_id.

Thus, summarizing the above variant of the embodiment of FIG. 2 according to FIG. 5, this variant differs from the one discussed above with respect to FIG. 3 in that the second information 142 does not explicitly signal as to how the slice addresses are to be amended. That is, the second information 142 does, in accordance with the variant just outlined, not explicitly signal a substitute for a slice address of slice portions extracted from data stream 124 into data stream 136. Rather, the embodiment of FIG. 5 relates to the case where the first information 140 defines the spatial section 110 within the picture area of picture 100 as being composed of, at least, a first sectional region within which the video is encoded into the video data stream 124' independent from outside the first sectional region 100a, and the second sectional region 110b within which the video 120 is coded into the video data stream 124' independent from outside the second sectional regional 110b, wherein none of the plurality of slices 108 crosses borders of any of the first and second sectional regions 110a and 110b; at least in units of these regions 110a and 110b, the pictures 144 of the output video 138 of the extracted video data stream 136 may be composed differently, thus yielding two options, and in accordance with the variant discussed above with respective to FIG. 5, the second information 142 signals re-sorting information indicating how to re-sort the slice portions 126 of slices 108 located in section 110 in extracting the reduced video data stream 136 from the video data stream 124' relative to the slice portions' order and video data stream 124'. The re-sorting information 142 may comprise, for instance, a set of one or more syntax elements. Among the possible states which may be signaled by the one or more syntax elements forming information 142, there may be one according to which the re-sorting maintains the original ordering. For instance, information 142 signals a rank (cp. 141 in FIG. 5) for each slice portion 126 coding one of the slices 108 of a picture 100 which falls into section 110, and the extractor device 134 re-orders the slice portions 126 within the extracted or reduced video data stream 136 according to these ranks. The extractor device 134, then, amends the slice addresses of the thus-rearranged slice portions 126 within the reduced or extracted video data stream 136 in the following manner: the extractor device 134 knows about those slice portions 126 within video data stream 124' which were extracted from data stream 124' into data stream 136. Extractor device 134, thus, knows about the slices 108 corresponding to these taken-over slice portions 126 within the picture area of picture 100. Based on the re-arrangement information provided by information 142, the extractor device 134 is able to determine as to how sectional regions 110a and 110b have been mutually shifted in a translatory manner so as to result into the rectangular picture area corresponding to picture 144 of video 138. For instance, in the exemplary case of FIG. 4, option 2, the extractor device 134 allocates the slice address 0 to the slice corresponding to tile b as the slice address 0 occurs at the second position in the list of ranks as provided in the second information 142. The extractor device 134 is, thus, able to place the one or more slices pertaining to tile b, and then follow with the next slice which, according to the resorting information, is associated with the slice address pointing to the position which, according to coding order 112, immediately follows tile b in picture area. In the example of FIG. 4, this is the slice concerning tile a, as the next ranked position is indicated for the first slice a in section 110 of picture 100. In other words, the re-sorting is restricted to lead to any of possible re-arrangements of sectional regions 110a and 110b. For each sectional region, individually, it holds true that the coding orders 106 and 112 traverse the respective sectional region in the same path. Due to the tiling, however, it might be that the regions corresponding to sectional regions 110a and 110b in picture area of picture 144, namely, the regions of the combination of tiles b and d on the one hand and the combination of tiles A and C on the other hand, in case of option 2, are traversed in an interleaved manner by coding order 112 and that, accordingly, the associated slice portions 126 encoding slices lying in the corresponding tiles are interleaved within the extracted or reduced video stream 136.

A further embodiment is signaling a guarantee that a further order signaled using existing syntax reflects the advantageous output slice order. More concretely, this embodiment could be implemented by interpreting the occurrence of the MCTS extraction SEI message [2] as a guarantee that the order of rectangles forming an MCTS in the MCTS SEI message from section D.2.29 and E.2.29 in [1] represents the advantageous output order of tiles/NAL units. In the concrete example of FIG. 5 that would result in using a rectangle for each included tile in the order {b, a, d, c}. An example for this embodiment would be identical to the above one except for the derivation of OutputSliceOrder [j], e.g.

OutputSliceOrder[j] is derived from order of rectangles signaled in the MCTS SEI message.

Summarizing the above example, the second information 142 could signal to the extractor 134 how to re-sort the slice portions 126 of slices falling into the spatial section 110 in extracting the reduced video data stream 136 from the video data stream relative to how the slice portions 126 are ordered in the sequence of slice portions of the video data stream 124', the slice address of each slice portion 126 of the sequence of slice portions of the video data stream 124' one-dimensionally indexes a position of a coding start of the slice 108 encoded into the respective slice portion 126 along the first coding scan order 106 which traverses the picture area and along which the picture 100 has been coded into the sequence of slice portions of the video data stream. Thereby, the slice address of the slice portions of the sequence of slice portions within the video data stream 124' monotonically increases, and the amending the slice address in the extraction of the reduced video data stream 136 from the video data stream 124' is defined by sequentially placing the slices encoded into the slice portions to which the reduced video data stream 136 is confined and which are re-reordered as signaled by the second information 142, along a second coding scan order 112 which traverses the decreased picture area and setting the slice address of the slice portions 126 to index the position of the coding start of the slices measured along the second coding scan order 112. The first coding scan order 106 traverses the picture area within each of the set of at least two sectional regions in a manner congruent to how the respective spatial region is traversed by the second coding scan order 112. Each of the set of at least two sectional regions is indicated by the first information 140 as a subarray of rectangular tiles into rows and columns of which the picture 100 is subdivided, wherein the first and second coding scan orders uses a row-wise tile raster scan with traversing a current tile completely before proceeding with a next tile.

Already described above, the output slice order may be derived from another syntax element such as the output_slice_address[i][j] as described above. An important addition to the exemplary syntax above regarding output_slice_address[i][j] in this case is that slice addresses are signaled for all associated slices including the first to enable sorting, i.e. num_associated_slices_minus2[i] becomes num_associated_slices_minus1[i]. An example for this embodiment would be identical to the above one except for the derivation of OutputSliceOrder[j], e.g.

OutputSliceOrder[j] is derived from the list output_slice_address[i][j] for the i-th extraction information set.

An even further embodiment would consist of a single flag on information 142 that indicates that the video content wraps around at a set of picture boundaries, e.g. the vertical picture boundaries. Hence, an output order is derived in the extractor 134 that accommodates for picture subsections that include tiles on both picture boundaries as outlined before. In other words, information 142 could signal one out of two options: a first option of the plurality of options indicates that the video is a panoramic video showing a scene in a manner where different edge portions of the picture scenically abut each other and a second option of the plurality of options indicates that the different edge portions do not scenically abut each other. The at least two sectional regions a, b, c, d which section 110 is composed of form first and second zones 110a, 110b which neighbor different ones of the different edge portions, namely left and right edge $150_r$ and $150_l$, so that, in case of the second information 142 signaling the first option, the decreased picture area is composed by putting together the set of at least two sectional regions so that the first and second zones abut along the different edge portions and, in case of the second information 142 signaling the second option, the decreased picture area is composed by putting together the set of at least two sectional regions with the first and second zones having the different edge portions facing away from each other.

For sake of completeness only it should be noted that the shape of the picture area of pictures 144 is not restricted to conform to a stitching together the various regions such as tiles a, b, c and d of section 110 together in a manner maintaining the relative arrangement of any connected clusters such as (a, c, b, d) in FIG. 1, or stitching together any such cluster along the shortest possible interconnecting direction such as horizontally stitching zones (a,c) and (b,d) in FIG. 2. Rather, for instance, in FIG. 1, the picture area of pictures of the extracted data stream could be a column of all four regions, and in FIG. 2 it could be a column of row of all four regions. In general, a size and shape of the picture area of picture 144 of video 138 could be present in data stream 124' at different portions: For instance, this information could be given in form of one or more parameters within information 140 so as to aim at guiding the extraction process in extractor 134 with respect to an adaptation of parameter sets when extracting a section specific substream 136 from stream 124'. A nested parameter set for substituting a parameter set in stream 124' could, for instance, be contained in information 140, with this parameter set containing, for instance a parameter relating to picture size which indicates the size and shape of picture 144 in, for instance pixels, so that the replacement of the parameter set of stream 124' during extraction in extractor 134 overwrites the old parameter in the parameter set which indicated the size of picture 100. However, it may additionally or alternatively be that the picture size of picture 144 is indicated as part of information 142. Explicitly signaling the shape of the picture 144 in as readily readable High Level Syntax elements such as information 142 might be especially advantageous if the slice addresses are not provided explicitly in information 142. Parsing the nested parameter sets to derive addresses, would then be used.

It should also be noted that more in sophisticated system setups, a cubic projection may be used. This projection avoids known weaknesses of the equirectangular projection such as heavily varying sampling density. However, a rendering stage may be used to recreate a continuous viewport from the content (or subsections thereof) when using the cubic projection. Such a rendering stage may come at varying complexity/capability tradeoffs, i.e., some viable and readymade rendering modules may expect a given arrangement of content (or subsections thereof). In such a scenario, the possibility to steer the arrangement as enabled with the following invention is vital.

In the following, embodiments are described which relate to a second aspect of the present application. The description of embodiments of the second aspect of the present application again starts with a brief introduction into the general issue or problem envisaged and addressed by way of these embodiments.

Figure 6:
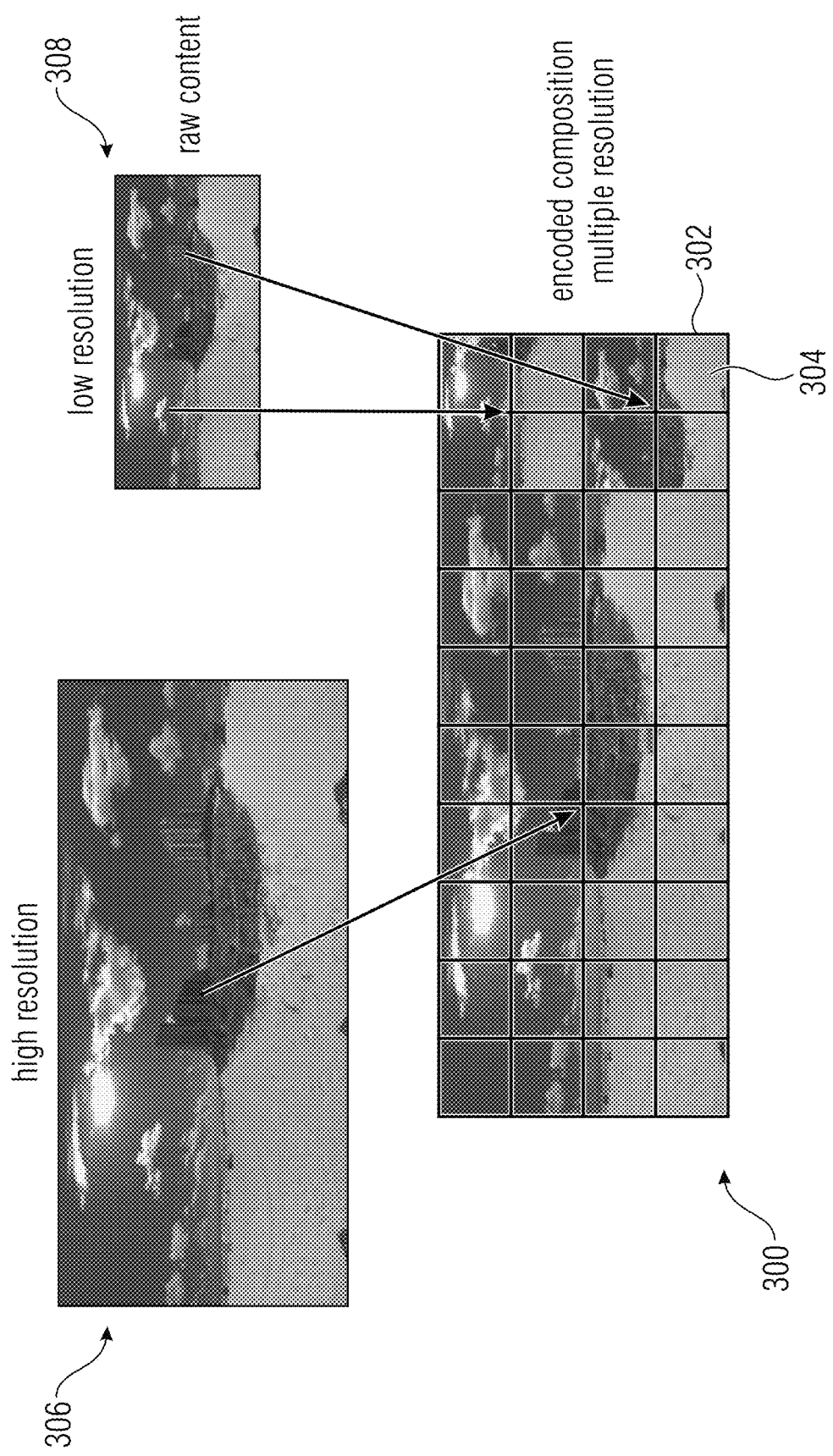
FIG. 6 shows a schematic diagram illustrating a multi-resolution 360° frame packaging example.

An interesting use case for MCTS extraction in context of but not limited to 360° video is composite video containing multiple resolution variants of content next to each other on the picture plane as illustrated in FIG. 6. The bottom part of FIG. 6 depicts the composition video 300 with multiple resolutions and lines 302 illustrate tile boundaries of tiles 304 into which the composition of the high resolution video 306 and the low resolution video 308 was sub-divided for encoding into a corresponding data stream.

To be more precise, FIG. 6 shows a picture out of a high resolution video at 306 and a picture such as a co-temporal picture of a low resolution video at 308. For example, both videos 306 and 308 show exactly the same scene, i.e., have the same figure or field of view, but different resolutions. The field of view may, however, alternatively overlap each other merely partially and in the overlap zone spatial resolution manifests itself in a different number samples of pictures of video 306 compared to video 308. In effect, videos 306 and 308 differ in fidelity, i.e., the number of samples or pixels for an equal scene section. Co-located pictures of videos 306 and 308 are composed into larger pictures side by side resulting in pictures of composition video 300. FIG. 6, for instance, shows that video's 308 pictures are halved horizontally, and the two halves are one on top of the other, attached at the right-hand side of the co-temporal picture of video 306 so as to result in the corresponding video 300. The tiling is performed in a manner so that no tile 304 crosses the junction between high resolution picture of video 306 on the one hand and the picture content stemming from the low resolution video 308 on the other hand. In the example of FIG. 6, the tiling of picture 300 leads to 8×4 tiles into which the high resolution picture content of the pictures of video 300 are partitioned, and 2×2 tiles, into which each of the halves are partitioned which stem from the low resolution video 308. Altogether, pictures of video 300 are 10×4 wide.

Figure 7:
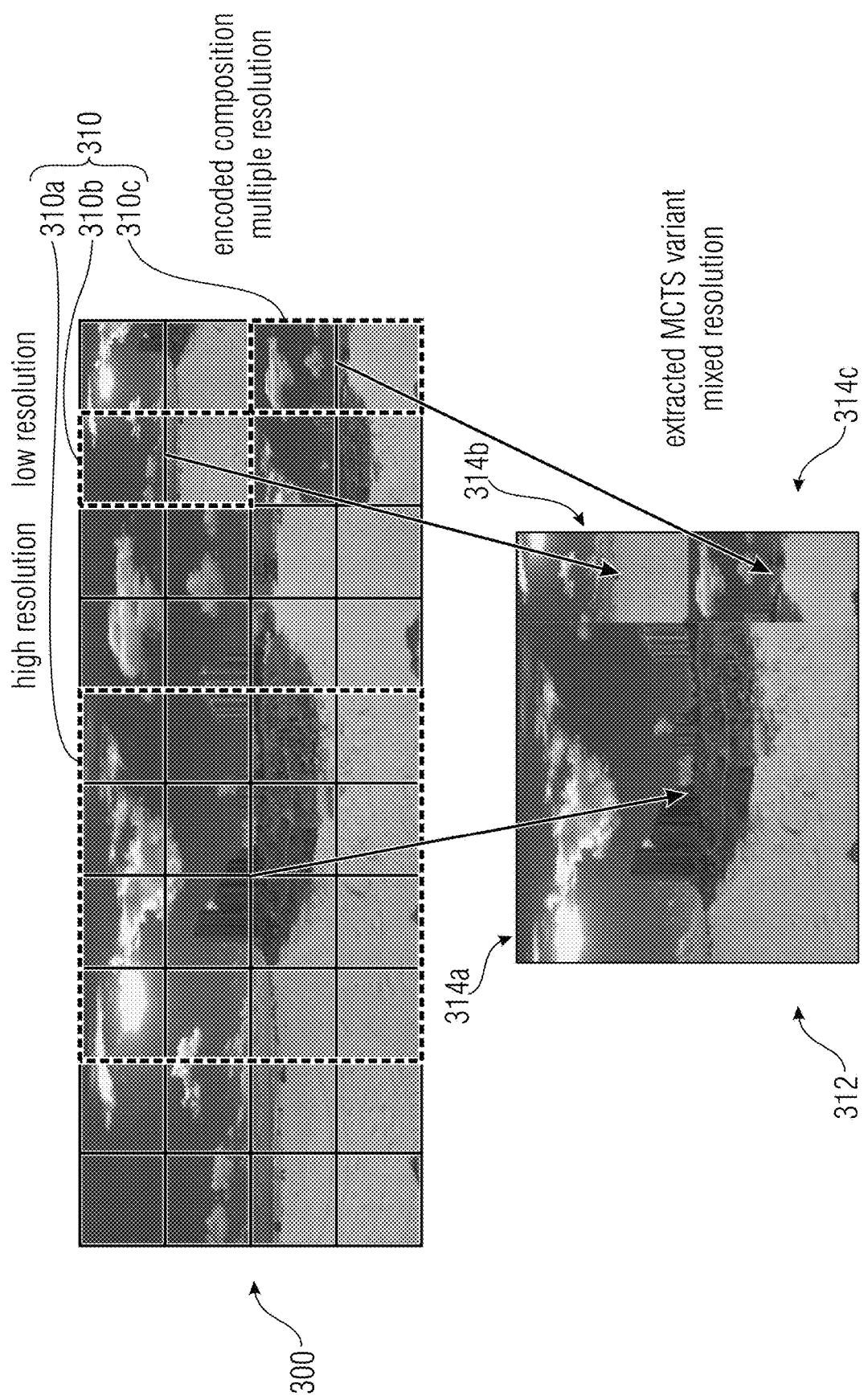
FIG. 7 shows a schematic diagram illustrating the extraction of an exemplary MCTS containing a mixed resolution representation.

When such a multiple resolution composition video 300 is encoded with MCTS in the proper way, MCTS extraction can yield a variant 312 of the content. Such a variant 312 could, for instance, be designed to depict a predefined sub-picture 310*a* in high resolution and the rest or another subsection of the scene in low resolution as depicted in FIG. 7 where the MCTS 310 within the composite picture bit stream is compared to three aspects or separate areas 310*a*, *b*, *c*.

That is, pictures of the extracted video, namely pictures 312, have three fields 314*a*, 314*b* and 314*c*, each corresponding to one of the MCTS regions 310*a*, *b*, *c*, with region 310*a* being a sub-area of the high resolution picture area of picture 300, and the other two regions 310*b* and 310*c* being sub regions of the low resolution video content of picture 308.

Figure 8:
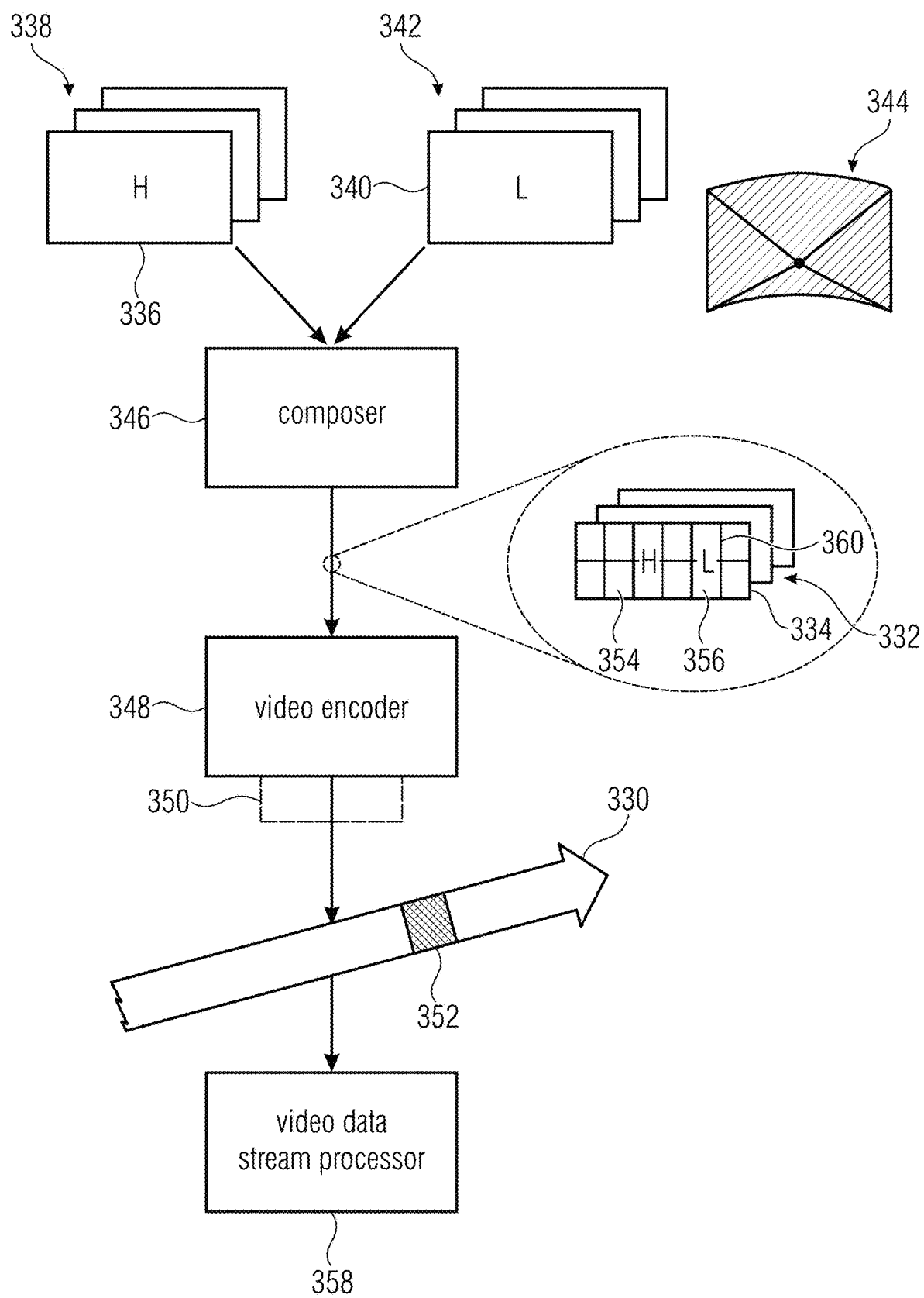
FIG. 8 shows a mixed schematic and block diagram illustrating an efficient way of multi-resolution scene provision to a user as well as the participating devices and video streams and processes according to an embodiment of a second aspect of the present application.

Having said this, with respect to FIG. 8, embodiments of the present application concerning the second aspect of the present application are described. In other words, FIG. 8 shows a scenario of presenting multi-resolution content to a recipient site and, in particular, the individual sites participating in the generation of the multiple versions of differing resolution down to the reception sites. It should be noted that the individual devices and processes arranged at the various sites along the process path depicted in FIG. 8 represent individual devices and methods and FIG. 8 should, thus, not be interpreted as illustrating a system or overall method only. A similar statement is true with respect to FIG. 2 which shows likewise individual devices and methods. The reasons for showing all these sites together in one figure is merely to ease the understanding of the inter-relationship and advantages resulting from the embodiments described with respect to these figures.

FIG. 8 shows a video data stream 330 having encoded thereinto a video 332 of pictures 334. Pictures 334 are the result of stitching together co-temporal pictures 336 of a high resolution video 338 and pictures 340 of a low resolution video 342 on the other hand. To be more precise, the pictures 336 and 340 of videos 338 and 342 either correspond to exactly the same view port 344 or at least partially overlap so as to show the same scene in the overlap region, wherein, however, the number of samples of the high resolution video pictures 336 sampling the same scene content as the corresponding low resolution pictures 340 is higher and, accordingly, the scene resolution of fidelity of pictures 336 is higher than those of picture 340. The composition of pictures 334 of composition video 332 on the basis of videos 338 and 342 is performed by a composer 346.

Composer 346 stitches together the pictures 336 and 340. In doing so, composer 346 may subdivide pictures of the high resolution video 338 of picture 340 of the low resolution video or both in order to result into an advantageous filling and patching of the picture area of the pictures 334 of the composition video 332. A video encoder 348 then encodes the composition video 332 into video data stream 330. A video data stream generation apparatus 350 may either be included into video encoder 348 or connected to the output of video encoder 348, so as to provide the video data stream 330 with a signalization 352 indicating that a picture 334, or each picture or video 332, or each picture or video 332 within a certain sequence of pictures within video 332, as coded into video data stream 330, shows a common scene content more than once, namely at different spatial portions at mutually different resolution. These portions are illustrated in FIG. 8 using H and L in order to denote their origin by way of the composition done by composer 346 and are indicated using reference signs 354 and 356. It should be noted that more than two different resolution versions may have been put together in order to form the content of picture 332 and that the usage of two versions as depicted in FIG. 8 and FIGS. 6 and 7, respectively, is merely for illustration purposes.

FIG. 8 shows for illustration purposes a video data stream processor 358 which receives video data stream 330. Video data stream processor 358 could, for instance, be a video decoder. In any case, video data stream processor 358 is able to inspect the signalization 352 in order to decide on the basis of this signalization whether or not video data stream processor 358 should commence processing such as decoding video data stream 330 further depending on, for instance, certain capabilities of video data stream processor 358 or devices connected downstream thereof. For instance, a video data stream processor 358 is merely able to present pictures 332 coded into video data stream 330 completely, then video data stream processor 358 may refuse processing video data streams 330, the signalization 352 of which indicates that the individual pictures thereof show a common scene content at different spatial resolutions at different spatial portions of these individual pictures, i.e., a signalization 352 indicates that the video data stream 330 is a multi-resolution video data stream.

The signalization 352 may, for instance, comprise a flag conveyed within data stream 330, the flag being switchable between a first state and a second state. The first state could, for example, indicate the just outlined fact, namely that individual pictures of the video 332 show multiple versions of the same scene content at different resolution. The second state indicates that such a situation does not exist, i.e., the pictures merely show one scene content at one resolution only. Video data stream processor 358 would, thus, be responsive to the flag 352 being in the first state so as to refuse the performance of certain processing tasks.

The signalization 352, such as the aforementioned flag, could be conveyed within data stream 330 within a sequence parameter set or video parameter set thereof. A possible syntax element reserved for future use in HEVC is exemplary identified as a possible candidate in the following description.

As indicated above with respect to FIGS. 6 and 7, it is not necessary but it could be that a composed video 332 has been coded into a video data stream 330 in a manner so that the coding is, with respect to each of a set of mutually non-overlapping spatial regions 360, such as tiles or tile sub-arrays, independent from outside the respective spatial region 360. The coding non-dependency restricts, as described above with respect to FIG. 2, spatial and temporal prediction and/or context derivations so as to not cross the border between the spatial regions 360. Thus, for instance, coding dependency may restrict the coding of a certain spatial region 360 of a certain picture 334 of video 332 to refer to the co-located spatial region within another picture 334 of video 332 only which picture is subdivided into spatial regions 360 in the same manner as picture 334. Video encoder 348 may provide the video data stream 330 with extraction information such as information 140 or the combination of information 140 and 142 or a respective apparatus, like apparatus 128, may be connected to its output. The extraction information may relate to certain or all possible combinations of spatial regions 360 as an extraction section such as extraction section 310 in FIG. 7. The signalization 352, in turn, may comprise information on a spatial subdivision of pictures 334 of video 332 into sections 354 and 356 of differing scene resolution, i.e., on size and location of each spatial section 354 and 356 within the picture area of picture 332. On the basis of such information within signalization 352, video data stream processor 358 could, for instance, exclude certain extraction sections from the list of possibly extractable sections of video stream 330 such as, for instance, those extraction sections which mix spatial regions 360 falling into different ones of sections 354 and 356, thereby avoiding the performance of video extraction with respect to extraction sections mixing different resolutions. In this case, video stream processor 358 could, for instance, comprise an extractor device such as extractor device of FIG. 2.

Additionally or alternatively, signalization 330 could comprise information on a different resolution at which the pictures 334 of video 332 show the mutually common scene content. Further, it is also possible that signalization 352 merely indicates the count of different resolutions at which pictures 334 of video 332 show a common scene content multiple times at different picture locations.

As already mentioned, video data stream 330 could comprise extraction information on a list of possible extraction regions with respect to which video data stream 330 is extractable. Then, signalization 352 could comprise further signalization indicating, for each of at least one or more of these extraction regions, a viewport orientation of a sectional region of the respective extraction region within which the common scene content is shown at highest resolution within the respective extraction region, and/or an area share of the sectional region of the respective extraction region within which the common scene content is shown at highest resolution within the respective extraction region, out of an overall area of the respective extraction region and/or a spatial subdivision of the respective extraction region into sectional regions within which the common scene content is shown, respectively, at mutually different resolution, out of an overall area of the respective extraction region.

Thus, such signaling 352 may be exposed at a high level in the bitstream so that it can be easily pushed up into the streaming system.

One option is to use one of the general reserved zero Xbits flags in the profile tier level syntax. The flag could be named as general non-multi-resolution flag:

General non-multi-resolution flag equal to 1 specifies the decoded output picture does not contain multiple versions of the same content at varying resolution (i.e., respective syntax such as regional packing is constrained). General non-multi-resolution flag equal to 0 specifies that the bitstream might contain such content (i.e., no constraints).

In addition, the present invention therefore consists of signaling that informs about the nature of the complete bitstream content characteristics, i.e., number and resolution of variants in the composition. Furthermore, additional signaling that provides in an easily accessible form information in the coded bitstream about the following characteristics of each MCTS:

Main viewpoint orientation:
What is the orientation of the MCTS high resolution viewport center, for instance in terms of delta-yaw, -pitch and/or -roll from a predefined initial viewport center.
Overall coverage
What percentage of the full content is represented in the MCTS.
High-to-Low_Res-Ratio
What is the ratio between high and low resolution areas in the MCTS, i.e. how much of the overall covered full content is represented at high resolution/fidelity There exists already signaling information proposed for viewport orientation or overall coverage of a full omnidirectional video. Similar signaling may be added for the sub-regions that might be potentially extracted. The information is in the form of an SEI [2] and therefore could be included in Motion-constrained tile sets extraction information nesting SEI. However, such information may be used to select the MCTS that is to be extracted. Having the information in the in Motion-constrained tile sets extraction information nesting SEI adds an additional indirection and may use deeper parsing (the Motion-constrained tile sets extraction information nesting SEI holds additional information that is not required for selecting an extracted set) in order to select a given MCTS. From the design perspective, it is a cleaner approach to signal this information or a subset of it in a central point that only contains important information to select an extracted set. In addition, the mentioned signaling includes information about the whole bitstream and in the proposed case it would be desirable to signal which is the coverage of the high resolution and which is the coverage of the low resolution or, if more resolutions are mixed, which is the coverage of each resolution as well as viewport orientation of the mixed resolution extracted video.

An embodiment would be to add the coverage of each of the resolutions and add it to 360 ERP SEI from [2]. Then this SEI would be potentially included into the Motion-constrained tile sets extraction information nesting SEI and the cumbersome task described above would need to be carried out.

In another embodiment, a flag is added to the MCTS extraction information set SEI, e.g., omnidirectional information that indicates the presence of the discussed signaling so that only the MCTS extraction information set SEI may be used for selecting the set to be extracted.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A non-transitory digital storage medium storing a video data stream comprising
   a sequence of slice portions, each slice portion having encoded thereinto a respective slice of a plurality of slices of a picture of a video, wherein each slice portion comprises a slice address indicating a location where, in a picture area of the video, the slice is located which the respective slice portion has encoded thereinto;
   extraction information indicating how to extract from the video data stream a reduced video data stream having encoded thereinto a spatially smaller video corresponding to a spatial section of the video by confining the video data stream to slice portions having encoded thereinto any slice within the spatial section and amending the slice address so as to relate to a decreased picture area of the spatially smaller video, the extraction information comprising
      a first information defining the spatial section within the picture area, wherein none of the plurality of slices crosses borders of the spatial section; and
      a second information signalling explicitly, as to how to amend the slice address of the slice portion of each slice within the spatial section so as to indicate, within the reduced video data stream, the location where, in the decreased picture area, the respective slice is located.

2. The video data stream according to claim 1, wherein the first information defines the spatial section within the picture area as being composed of a set of at least two sectional regions within each of which the video is encoded into the video data stream independent from outside the respective sectional region, wherein none of the plurality of slices crosses borders of any of the at least two sectional regions.

3. The video data stream according to claim 2, wherein
   a first option of the plurality of options indicates that the video is a panoramic video showing a scene in a manner where different edge portions of the picture scenically abut each other and
   a second option of the plurality of options indicates that the different edge portions do not scenically abut each other,
   wherein the at least two sectional region form first and second zones which neighbor different ones of the different edge portions,
   so that,
      in case of the second information signaling the first option, the decreased picture area is composed by putting together the set of at least two sectional regions so that the first and second zones abut along the different edge portions and,
      in case of the second information signaling the second option, the decreased picture area is composed by putting together the set of at least two sectional regions with the first and second zones having the different edge portions facing away from each other.

4. The video data stream according to claim 2, wherein
   the second information signals how to re-sort the slice portions of slices within the spatial section in extracting the reduced video data stream from the video data stream relative to how the slice portions are ordered in the sequence of slice portions of the video data stream, and
   the slice address of each slice portion of the sequence of slice portions of the video data stream one-dimensionally indexes a position of a coding start of the slice encoded into the respective slice portion along a first coding scan order which traverses the picture area and along which the picture has been coded into the sequence of slice portions of the video data stream so that
      the slice address of the slice portions of the sequence of slice portions within the video data stream monotonically increases, and
      the amending the slice address in the extraction of the reduced video data stream from the video data stream is defined by sequentially placing the slices encoded into the slice portions to which the reduced video data stream is confined and which are re-reordered as signaled by the second information, along a second coding scan order which traverses the decreased picture area and setting the slice address of the slice portions to index the position of the coding start of the slices measured along the second coding scan order.

5. The video data stream according to claim 4, wherein the first coding scan order traverses the picture area within each of the set of at least two sectional regions in a manner congruent to how the respective spatial region is traversed by the second coding scan order.

6. The video data stream according to claim 4, wherein each of the set of at least two sectional regions is indicated by the first information as a subarray of rectangular tiles into rows and columns of which the picture is subdivided, wherein the first and second coding scan orders uses a row-wise tile raster scan with traversing a current tile completely before proceeding with a next tile.

7. The non-transitory digital storage medium according to claim 1, wherein the second information signals, for each of at least a subset of the slice portions having any of the slices within the spatial section encoded thereinto, a substitute for the slice address.

8. The non-transitory digital storage medium according to claim 7, wherein the slice address of each slice portion of the sequence of slice portions of the video data stream relates to the video's picture area, and the substitute for the slice address relates to the decreased picture area.

9. The video data stream according to claim 6, wherein the slice address of each slice portion of the sequence of slice portions of the video data stream one-dimensionally indexes a position of a coding start of the slice encoded into the respective slice portion along a first coding scan order which traverses the picture area and along which the picture has been coded into the sequence of slice portions of the video data stream, and the substitute for the slice address one-dimensionally indexes the position of the coding start along a second coding scan order which traverses the decreased picture area.

10. The non-transitory digital storage medium according to claim 7, wherein the subset of the slice portions excludes a first slice portion of the slice portions of the sequence of slice portions having any of the slices within the spatial section encoded thereinto, and wherein the second information sequentially provides a substitute for each of the subset of the slice portions following an order at which the slice portions occur in the video data stream.

11. The non-transitory digital storage medium according to claim 7, wherein the first information defines the spatial section within the picture area as being composed of a set of at least two sectional regions within each of which the video is encoded into the video data stream independent from outside the respective sectional region, wherein none of the plurality of slices crosses borders of any of the first and second sectional regions.

12. The non-transitory digital storage medium according to claim 11, wherein the subset of the slice portions comprises all slice portions of the sequence of slice portions having any of the slices within the spatial section encoded thereinto, and wherein the second information sequentially provides a substitute for each of the slice portions following an order at which the slice portions occur in the video data stream.

13. The non-transitory digital storage medium according to claim 12, wherein
the second information further signals how to re-sort the slice portions of slices within the spatial section in extracting the reduced video data stream from the video data stream relative to how the slice portions are ordered in the sequence of slice portions of the video data stream, and
the second information sequentially provides a substitute for each of the subset of the slice portions following an order at which the slice portions occur in the reduced video data stream as resorted.

14. The non-transitory digital storage medium according to claim 1, wherein
the sequence of slice portions comprised by the video data stream comprises slice portions having encoded thereinto a slice within the spatial section and slice portions having encoded thereinto a slice external to the spatial section, or
the sequence of slice portions comprised by the video data stream comprise slice portions having encoded thereinto a slice within the spatial section, but is free of slice portions having encoded thereinto a slice external to the spatial section.

15. The video data stream according to claim 1, wherein the second information defines a shape and size of the decreased picture area.

16. The video data stream according to claim 1, wherein the first information defines a shape and size of the decreased picture area by way of a size parameter in a parameter set substitute ought to be used to substitute a corresponding parameter set in the video data stream in the extracting from the video data stream the reduced video data stream.

17. An apparatus for generating a video data stream configured to
provide the video data stream with a sequence of slice portions, each slice portion having encoded thereinto a respective slice of a plurality of slices of a picture of a video, wherein each slice portion comprises a slice address indicating a location where, in a picture area of the video, the slice which the respective slice portion has encoded thereinto is located;
provide the video data stream with extraction information indicating how to extract from the video data stream a reduced video data stream having encoded thereinto a spatially smaller video corresponding to a spatial section of the video by confining the video data stream to slice portions having encoded thereinto any slice within the spatial section and amending the slice address so as to relate to a decreased picture area of the spatially smaller video, the extraction information comprising
a first information defining the spatial section within the picture area within which the video is encoded into the video data stream independent from outside the spatial section, wherein none of the plurality of slices crosses borders of the spatial section; and
a second information explicitly signaling, as to how to amend the slice address of the slice portion of each slice within the spatial section so as to indicate, within the reduced video data stream, the location where, in the decreased picture area, the respective slice is located.

18. An apparatus for extracting from a video data stream having encoded thereinto the video a reduced video data stream having encoded thereinto a spatially smaller video, the video data stream comprising a sequence of slice portions, each slice portion having encoded thereinto a respective slice of a plurality of slices of a picture of a video, wherein each slice portion comprises a slice address indicating a location where, in a picture area of the video, the slice which the respective slice portion has encoded thereinto is located, wherein the apparatus is configured to
read extraction information from the video data stream,
derive from the extraction information a spatial section within the picture area, wherein none of the plurality of slices crosses borders of the spatial section, and wherein the reduced video data stream is confined to slice portions having encoded thereinto any slice within the spatial section,
amend the slice address of the slice portion of each slice within the spatial section using
an explicit signaling of
the extraction information, so as to which indicates, within the reduced video data stream, the location where, in a decreased picture area of the spatially smaller video, the respective slice is located.

19. A method for generating a video data stream comprising
provide the video data stream with a sequence of slice portions, each slice portion having encoded thereinto a respective slice of a plurality of slices of a picture of a video, wherein each slice portion comprises a slice address indicating a location where, in a picture area of the video, the slice which the respective slice portion has encoded thereinto is located;
provide the video data stream with extraction information indicating how to extract from the video data stream a reduced video data stream having encoded thereinto a spatially smaller video corresponding to a spatial section of the video by confining the video data stream to slice portions having encoded thereinto any slice within the spatial section and amending the slice address so as to relate to a decreased picture area of the spatially smaller video, the extraction information comprising
a first information defining the spatial section within the picture area within which the video is encoded into the video data stream independent from outside the spatial section, wherein none of the plurality of slices crosses borders of the spatial section; and a second information explicitly signaling, as to how to amend the slice address of the slice portion of each slice within the spatial section so as to indicate, within the reduced video data stream, the location where, in the decreased picture area, the respective slice is located.

20. A method for extracting from a video data stream having encoded thereinto the video a reduced video data stream having encoded thereinto a spatially smaller video, the video data stream comprising a sequence of slice portions, each slice portion having encoded thereinto a respective slice of a plurality of slices of a picture of a video, wherein each slice portion comprises a slice address indicating a location where, in a picture area of the video, the slice which the respective slice portion has encoded thereinto is located, wherein the method comprises read extraction information from the video data stream, derive from the extraction information a spatial section within the picture area, wherein none of the plurality of slices crosses borders of the spatial section, and wherein the reduced video data stream is confined to slice portions having encoded thereinto any slice within the spatial section, amend the slice address of the slice portion of each slice within the spatial section using an explicit signaling of the extraction information, which indicates, within the reduced video data stream, the location where, in a decreased picture area of the spatially smaller video, the respective slice is located.

21. A non-transitory digital storage medium having a computer program stored thereon to perform the method for generating a video data stream comprising provide the video data stream with a sequence of slice portions, each slice portion having encoded thereinto a respective slice of a plurality of slices of a picture of a video, wherein each slice portion comprises a slice address indicating a location where, in a picture area of the video, the slice which the respective slice portion has encoded thereinto is located;

provide the video data stream with extraction information indicating how to extract from the video data stream a reduced video data stream having encoded thereinto a spatially smaller video corresponding to a spatial section of the video by confining the video data stream to slice portions having encoded thereinto any slice within the spatial section and amending the slice address so as to relate to a decreased picture area of the spatially smaller video, the extraction information comprising a first information defining the spatial section within the picture area within which the video is encoded into the video data stream independent from outside the spatial section, wherein none of the plurality of slices crosses borders of the spatial section; and a second information explicitly signaling, as to how to amend the slice address of the slice portion of each slice within the spatial section so as to indicate, within the reduced video data stream, the location where, in the decreased picture area, the respective slice is located, when said computer program is run by a computer.

22. A non-transitory digital storage medium having a computer program stored thereon to perform the method for extracting from a video data stream having encoded thereinto the video a reduced video data stream having encoded thereinto a spatially smaller video, the video data stream comprising a sequence of slice portions, each slice portion having encoded thereinto a respective slice of a plurality of slices of a picture of a video, wherein each slice portion comprises a slice address indicating a location where, in a picture area of the video, the slice which the respective slice portion has encoded thereinto is located, wherein the method comprises read extraction information from the video data stream, derive from the extraction information a spatial section within the picture area, wherein none of the plurality of slices crosses borders of the spatial section, and wherein the reduced video data stream is confined to slice portions having encoded thereinto any slice within the spatial section, amend the slice address of the slice portion of each slice within the spatial section using an explicit signaling of the extraction information which indicates, within the reduced video data stream, the location where, in a decreased picture area of the spatially smaller video, the respective slice is located, when said computer program is run by a computer.

* * * * *